(12) United States Patent  
Takeda et al.

(10) Patent No.: US 7,201,507 B2  
(45) Date of Patent: Apr. 10, 2007

(54) PROJECTOR TYPE VEHICLE LIGHT

(75) Inventors: Yukari Takeda, Isehara (JP); Kazunori Iwasaki, Yamato (JP); Yasufumi Suzuki, Isehara (JP)

(73) Assignee: Ichikoh Industries, Ltd. (JP)

( * ) Notice: Subject to any disclaimer, the term of this patent is extended or adjusted under 35 U.S.C. 154(b) by 172 days.

(21) Appl. No.: 11/015,350

(22) Filed: Dec. 17, 2004

(65) Prior Publication Data

US 2005/0141235 A1 Jun. 30, 2005

(30) Foreign Application Priority Data

Dec. 25, 2003 (JP) ............... 2003-431258  
Mar. 3, 2004 (JP) ............... 2004-059680  
Mar. 15, 2004 (JP) ............... 2004-072993

(51) Int. Cl.  
*F21V 7/00* (2006.01)  
*B60Q 1/04* (2006.01)

(52) U.S. Cl. .................. 362/545; 362/516; 362/539

(58) Field of Classification Search ............. 362/545, 362/475, 507, 509, 514, 516, 517, 518, 519, 362/538, 539, 237, 240, 540, 543, 544, 296, 362/297, 304, 341, 317, 800  
See application file for complete search history.

(56) References Cited

U.S. PATENT DOCUMENTS 6,948,836 B2 * 9/2005 Ishida et al. ............... 362/516

6,951,416 B2 * 10/2005 Sazuka et al. ............... 362/538

FOREIGN PATENT DOCUMENTS

JP HEI-6-41010 5/1994

* cited by examiner

*Primary Examiner*—Sandra O'Shea  
*Assistant Examiner*—Bao Q. Truong  
(74) *Attorney, Agent, or Firm*—Kilpatrick Stockton LLP

(57) ABSTRACT

A projector type vehicle light includes: a light source provided close to the primary focusing point of a concave mirror; and a convex lens, wherein the light source comprises a group of LEDs; each of the LED is located in each of a small concave mirror in a small reflector which has an ellipsoidal surface of rotation or a free surface as a part of the ellipsoidal surface of rotation provided on the inner surface thereof; the convex lens comprises a group of small convex lenses provided to cover the front opening of the small reflectors respectively; each of the LED is located close to the primary focusing point of a small concave mirror in a small reflector and faces at its emitter side to the small concave mirror; and a shade comes close to the secondary focusing point of the small concave mirror and assembled together with the small convex lens and the LED, whereby each of the small projector type lamps in the array is completed.

8 Claims, 17 Drawing Sheets

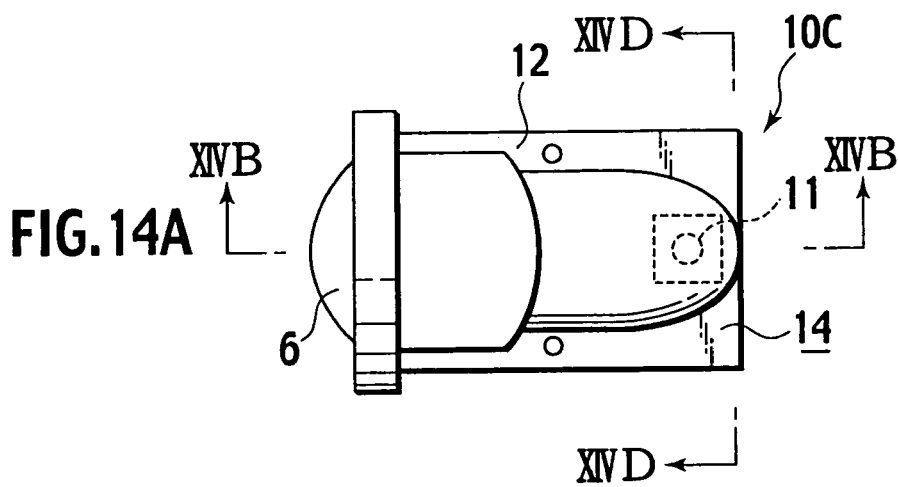
FIG.14A
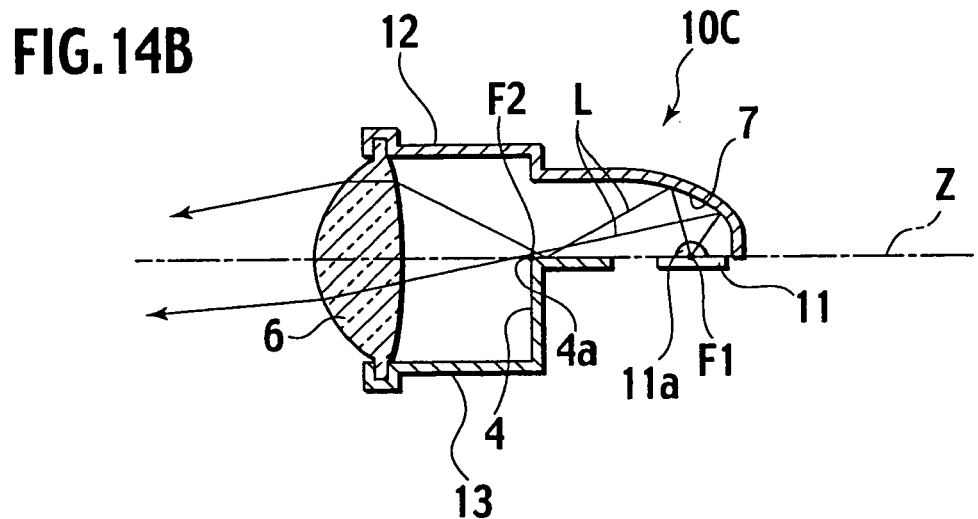
FIG.14B
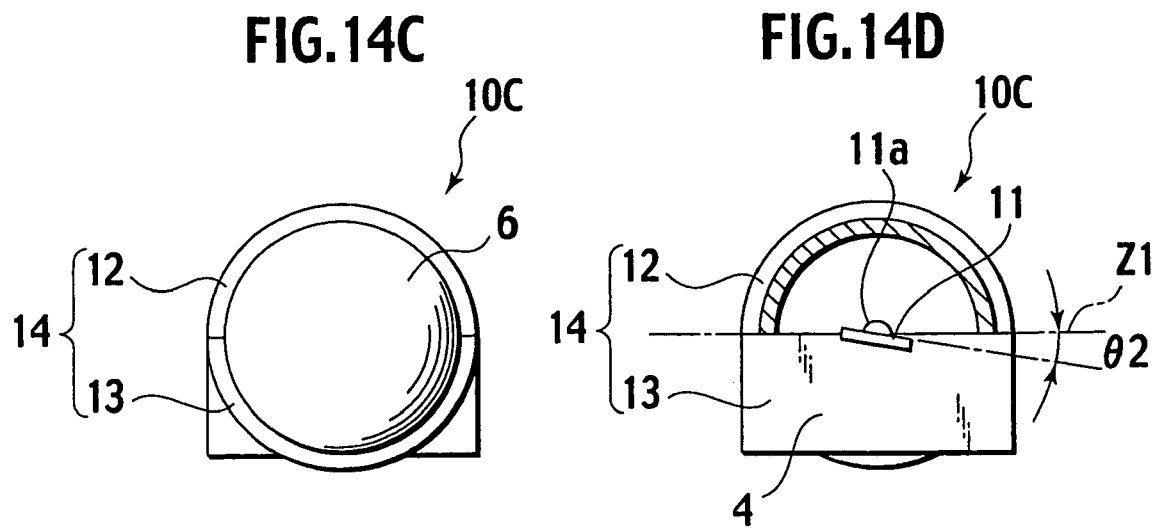
FIG.14C
FIG.14D

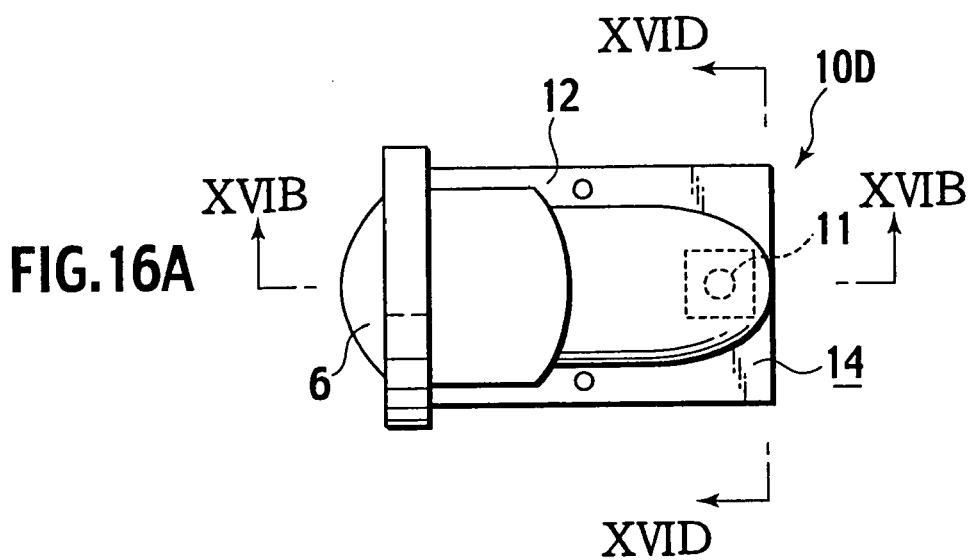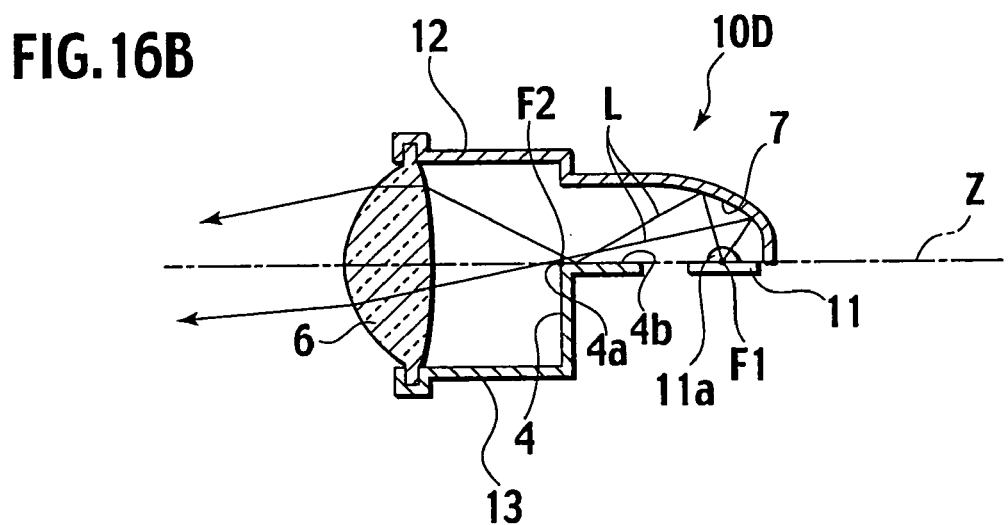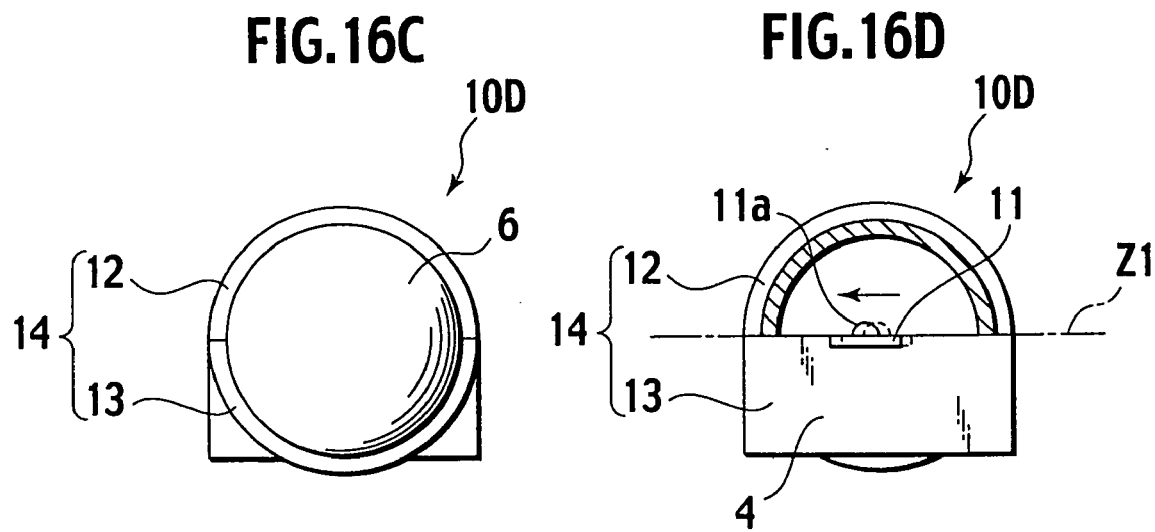

PROJECTOR TYPE VEHICLE LIGHT

BACKGROUND OF THE INVENTION

1. Field of the Invention

The present invention relates to a projector type vehicle light employing an LED (light emitting diode) as the light source for use as a headlamp in a vehicle.

2. Description of the Related Art

FIG. 1 shows a conventional projector type vehicle light 100 which is disclosed in Japanese Utility model Application Laid-Open No. Hei-6-41010 (Application No. Hei-4-76322). The vehicle light 100 comprises a light source bulb 2 provided close to the primary focusing point of a concave mirror 1 and a convex lens 3 for modulating the flux of light emitted from the light source bulb 2 and reflected by the concave mirror 1 to substantially a parallel light which is then directed towards the front.

More specifically, the vehicle light 100 has a shade 4 provided between the light source bulb 2 and the convex lens 3 for projecting a desired cut-line pattern of light selectively used when the vehicle passes through another.

The light source bulb 2 has a filament located at the primary focusing point of the concave mirror 1 and an electric connection fitted into a tubular opening 1a thereof. A frame 5 is mounted to the opening end of the concave mirror 1 and arranged to which the convex lens 3 is fixedly joined and supporting the shade 4.

The vehicle light 100 also has a ventilation through hole 1b and ventilation through holes 1c provided therein just above and below the tubular opening 1a of the concave mirror 1 respectively where the light source bulb 2 is installed, as best shown in FIG. 2.

When the vehicle light 100 is lit, its temperature will increase about the light source bulb 2, however, since the heat generated is emitted out by the effect of thermal convection between the through holes 1b and 1c, temperature rising about the light source bulb 2 can be suppressed.

However, the vehicle light 100 has a disadvantage that while the light source bulb 2 releases an output of light at higher thermal energy, the convex lens 3 has to be made of a glass material thus increasing the overall weight.

Also in the vehicle light 100, while the convex lens 3 is made of glass, the concave mirror 1 is made of an aluminum vapor deposited sheet, a resin sheet, or a steel sheet, the shade 4 is made of an aluminum vapor deposited sheet or a steel sheet, and the frame 5 is made of an aluminum vapor deposited sheet. Since the components of the vehicle light 100 are made of different materials, they have to be fabricated separately before assembled together. Also, the assembly process may however be troublesome in which the light axis to be set at higher precision is deviated from the designed requirement due to variations in the assembly dimensions as well as the component dimensions. As a result, the lighting performance may be declined.

Moreover, as the number of its components is not small, the vehicle light 100 will be intricate in the component management, increased in the number of assembling steps, and not reduced in the overall cost.

As having been in service, the concave mirror 1 in the vehicle light 100 may be declined at the center area in the reflectivity where the through holes 1b and 1c are provided. Accordingly, the hot zone at the center of the pattern of light emission will be declined in the intensity.

The vehicle light 100 also permits the pattern of light emission to be released in one single mode, whereby the lighting can hardly be modified delicately depending on the condition of a road, the information of a map, and/or the running speed of the vehicle.

For example, a spot of intensified light is desired during the running at high speeds while dim lighting without spotting is preferable in a town. When the vehicle runs at a curve, its lighting along the curve will be desired with the spot of light shifting from left to right or vice versa.

SUMMARY OF THE INVENTION

It is hence an object of the present invention to provide a projector type vehicle light which is minimized in the number of components as well as the overall weight, stabilized in the direction of light, improved in the intensity of light emitting through the hot zone of a desired pattern with the reflectivity of its concave mirror increased to maximum, and enabled for delicately controlling the direction of light in response to the running condition of a vehicle.

For achievement of the foregoing object, according to a first aspect of the present invention, there is provided a projector type vehicle light which comprises: a light source provided close to the primary focusing point of a concave mirror; and a convex lens for modulating the flux of light emitted from the light source and reflected by the concave mirror to a substantially parallel light which is then directed forward, wherein the light source comprises a group of LEDs; wherein each of the LED is located in each of a small concave mirror in a small reflector which has an ellipsoidal surface of rotation or a free surface as a part of the ellipsoidal surface of rotation provided on the inner surface thereof; wherein the convex lens comprises a group of small convex lenses provided to cover the front opening of the small reflectors respectively; wherein each of the LED is located close to the primary focusing point of a small concave mirror in a small reflector and faces at its emitter side to the small concave mirror; and wherein a shade comes close to the secondary focusing point of the small concave mirror and assembled together with the small convex lens and the LED, whereby each of the small projector type lamps in the array is completed.

According to a second aspect of the present invention as it depends from the first aspect, there is provided a projector type vehicle light wherein a light emitting potion of the LED is inclined so as to be lowered in the backward direction of the small concave mirror.

According to a third aspect of the present invention as it depends from the first aspect, there is provided a projector type vehicle light wherein a light emitting potion of the LED is inclined in the wide direction of the small concave mirror.

According to a fourth aspect of the present invention as it depends from the first aspect, there is provided a projector type vehicle light wherein the LED is horizontally offset from the primary focusing point to leftward or rightward in the wide direction of the small concave mirror.

According to a fifth aspect of the present invention, there is provided a projector type vehicle light which comprises: a light source provided close to the primary focusing point of a concave mirror; and a convex lens for modulating the flux of light emitted from the light source and reflected by the concave mirror to a substantially parallel light which is then directed forward, wherein the light source comprises a group of LEDs; wherein each of the LED is located close to the primary focusing point of a small concave mirror in a small reflector and faces at its emitter side to the small concave mirror which has an ellipsoidal surface of rotation or a free surface as a part of the ellipsoidal surface of rotation provided on the inner surface thereof; wherein the convex lens comprises a group of small convex lenses provided to cover the front opening of the small reflectors respectively; wherein the smaller reflectors and the small convex lenses are made of resin materials; wherein the small reflector comprises an upper reflector formed integrally with the small concave mirror and a lower reflector formed integral with a shade which has a folded edge portion extending along the meridional plane and a reflective portion extending rearwardly from the top of the folded edge portion in substantially the horizontal wherein the lower reflector is joined from below to the upper reflector; wherein the upper reflector and the lower reflector of the each small reflector are positioned so that the folded edge portion comes close to the secondary focusing point of the small concave mirror and assembled together with the small convex lens and the LED, whereby each of the small projector type lamps in the array is completed; wherein in particular, at least one of the small projector type lamps in the array is arranged with its LED tiltable about an orthogonal axis extending at a right angle to the optical axis of the small projective type lamp so that it can switch between the spot centered pattern of lighting and the spotless pattern of lighting; and wherein the array of the small projective type lamps are installed in a housing.

According to the first or the fifth aspect of the present invention, the output of light from the LED of each of the small projector type lamps towards the small concave mirror is reflected by the small concave mirror and passed through the small convex lens where it is modulated to a parallel light before released forward and can thus produce a desired pattern of lighting.

The LED provided as the light source is minimized in the size of the small reflector thus ensuring the space saving and smaller in the thermal energy of its light output than a filament-based light source.

Accordingly, the lamp chamber can be prevented from being sharply increased in the temperature while the small convex lens and the small reflector are possibly made of appropriate resin materials.

Since, the small convex lens and the small reflector can be made of appropriated resin materials, it is possible to fabricate them at higher precision than those made of steel sheets or aluminum evaporation sheets. As the shade having the substantially horizontal reflective portion is formed integrally with the lower reflector, its reflective portion allows the reflection of light from the small concave mirror to be reflected forward thus increasing the illumination of light across the small convex lens.

The upper reflector of the small reflector is formed integral with the small concave mirror while the lower reflector is formed integral with the shade. Accordingly, since the two reflectors are joined tightly to each other, the positional relationship between the small convex lens, the small concave mirror, the LED, and the shade can be ensured relatively at higher precision along the optical axis.

The shade in the small projector type lamp is arranged with the reflective side having a specific cross section hence providing the pattern of lighting defined by the cut-off line for ease of the passing through. Also, the LED as the light source is arranged tiltable about the orthogonal axis extending at a right angle to the optical axis of the small projector type lamp, whereby the pattern of lighting can be converged or dispersed under proper control.

Since at least one of the small projector type lamps in the array is arranged with the LED tiltable, the pattern of lighting can be switched by the movement and direction of the tilting of the LED between the spot centered pattern and the spotless pattern.

According to a sixth aspect of the present invention, there is provided a projector type vehicle light which comprises: a light source provided close to the primary focusing point of a concave mirror; and a convex lens for modulating the flux of light emitted from the light source and reflected by the concave mirror to a substantially parallel light which is then directed forward, wherein the light source comprises a group of LEDs; wherein each of the LED is located close to the primary focusing point of a small concave mirror in a small reflector and faces at its emitter side to the small concave mirror which has an ellipsoidal surface of rotation or a free surface as a part of the ellipsoidal surface of rotation provided on the inner surface thereof; wherein the convex lens comprises a group of small convex lenses provided to cover the front opening of the small reflectors respectively; wherein the smaller reflectors and the small convex lenses are made of resin materials; wherein the small reflector comprises an upper reflector formed integrally with the small concave mirror and a lower reflector formed integral with a shade which has a folded edge portion extending along the meridional plane and a reflective portion extending rearwardly from the top of the folded edge portion in substantially the horizontal wherein the lower reflector is joined from below to the upper reflector; wherein the upper reflector and the lower reflector of the each small reflector are positioned so that the folded edge portion comes close to the secondary focusing point of the small concave mirror and assembled together with the small convex lens and the LED, whereby each of the small projector type lamps in the array is completed; and wherein in particular, at least one of the small projector type lamps in the array is arranged with its LED tiltable about the optical axis of the small projective type lamp so that it can move the spot in the pattern of lighting to the left and the right within the pattern of lighting while the array of the small projective type lamps are installed in a housing.

Therefore, the optical action of the vehicle light according to the second aspect will be identical to that of the first aspect except the switching of the pattern of lighting.

According to the sixth aspect of the present invention, the LED of at least one of the small projector type lamps in the array is arranged tiltable about the optical axis of the small projector type lamp and its tilting action in both the distance and the direction can shift the spot in the pattern of lighting leftwardly and rightwardly within the pattern of lighting. Therefore, the pattern of lighting can be modified to determine the optimum position of the spot.

According to a seventh aspect of the present invention as it depends from the first or the second aspect, the projector type vehicle light is modified that the upper and lower reflectors are formed integral with holding portions for holding the small convex lens between the two reflectors.

The vehicle light defined in the third aspect can hence have the positional relationship between the small convex lens, the small concave mirror, the LED, and the shape of each small projector type lamp to be ensured at higher precision along the optical axis.

As described, the sixth aspect of the present invention is featured in that the LED as the light source is minimized in the size of the small reflector thus to ensure the space saving. In addition, the thermal energy of the output of light from the LED is smaller than that of a filament-based light source thus preventing the lamp chamber from increasing the temperature. Also, with its small convex lenses and small reflectors made of appropriate resin materials, the vehicle light can be minimized in the overall size and reduced in the weight.

According to the first or the fifth aspect of the present invention, the small concave mirror is free from having through holes therein for ventilation and the reflective portion of the shade extends substantially in the horizontal, whereby the flux of light can be released across the small convex lens at optimum level by the reflecting effect of the small concave mirror. As a result, the pattern of lighting can be projected at optimum illumination particularly at the spot thus improving the visibility along a road to be navigated.

According to the first or the fifth aspect of the present invention, the small convex lens and the small reflector are made of desired resin materials and can thus be fabricated at a higher precision than those made of steel sheets or aluminum deposited sheets. The small reflector allows its upper reflector to be formed integral with the small concave mirror and its lower reflector to be formed integral with the shade. While the two reflectors are joined together in tightness, the small convex lens, the small concave mirror, the LED, and the shade can be aligned at higher accuracy in both positional and optical relationships. Accordingly, the small projector type lamps will be enhanced and stabilized in the optical properties thus contributing to the optical improvement in the vehicle light.

According to the first or the fifth aspect of the present invention, the number of the components is minimized thus facilitating the management for storage of the components and the assembling of the components and succeedingly reducing the overall cost.

According to the first or the fifth aspect of the present invention, the LED of at least one of the small projector type lamps is arranged tiltable for controlling the convergence and dispersant of its output light through adjustably determining the distance and direction. As a result, the pattern of light can be switched between the spot centered pattern and the spotless pattern for delicate modification in response to the running condition of a vehicle.

According to the sixth aspect of the present invention, the LED of at least one of the small projector type lamps in the array is arranged tiltable about the optical axis of the small projector type lamp so that the spot in the pattern of light can be moved to the left and the right within the pattern of light by the distance and direction of the tilting of the LED. This allows the pattern of lighting to be optimized with its spot spotted at a desired location thus proving an optimum mode of illumination in response to the running condition of a vehicle.

According to the sixth aspect of the present invention, the optical action will be identical to that defined in claim 1 except the switching of the pattern of lighting.

According to the seventh aspect of the present, the holding portions for the small convex lens are provided on the upper and lower reflectors respectively. This allows the positional relationship between the small convex lens, the small concave mirror, the LED, and the shade to be aligned at higher precision, hence further improving the optical properties of the apparatus in addition to the advantage defined in the fifth or the sixth aspect of the present invention.

BRIEF DESCRIPTION OF THE ACCOMPANYING DRAWINGS

Figure 3:
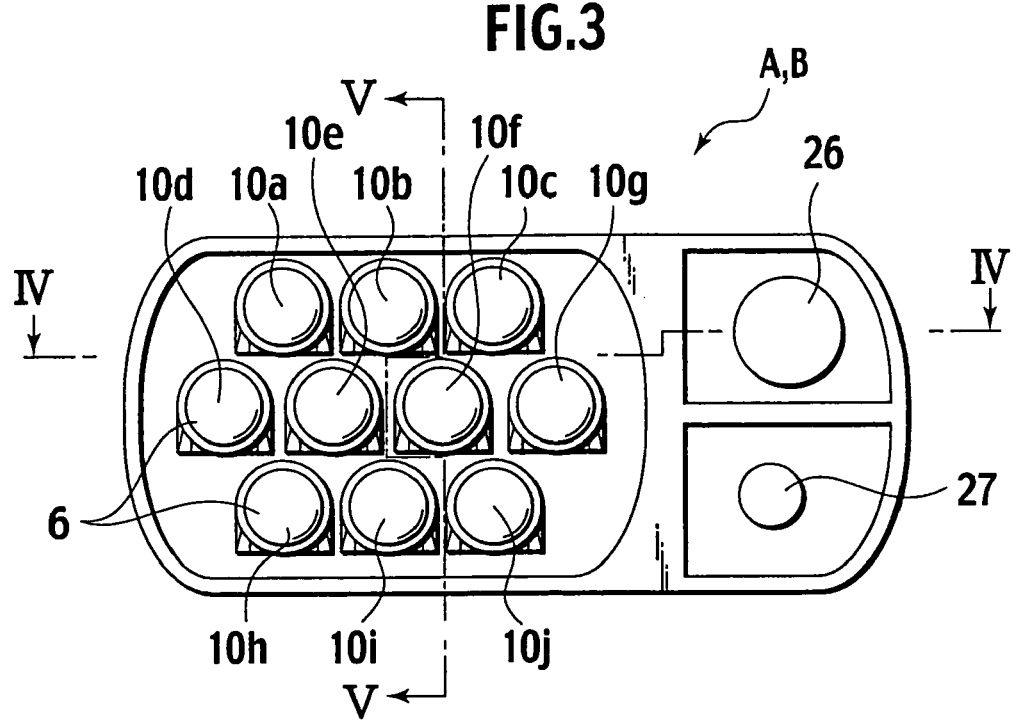
FIG. 3 is a front entire view of a projector type vehicle light according to the present invention.
Figure 8A:
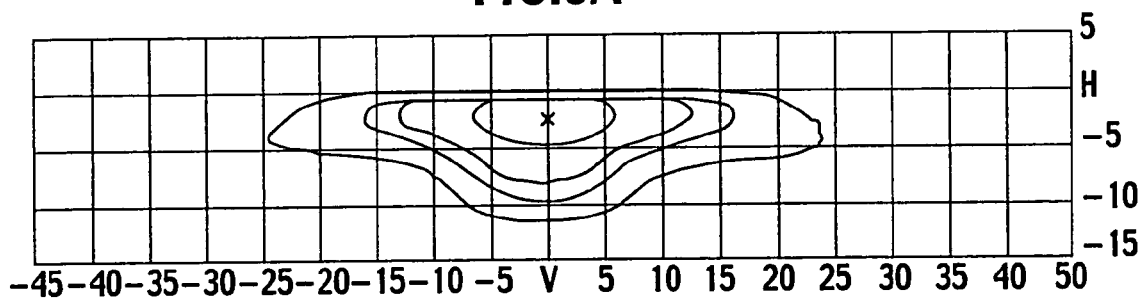
Figure 8B:
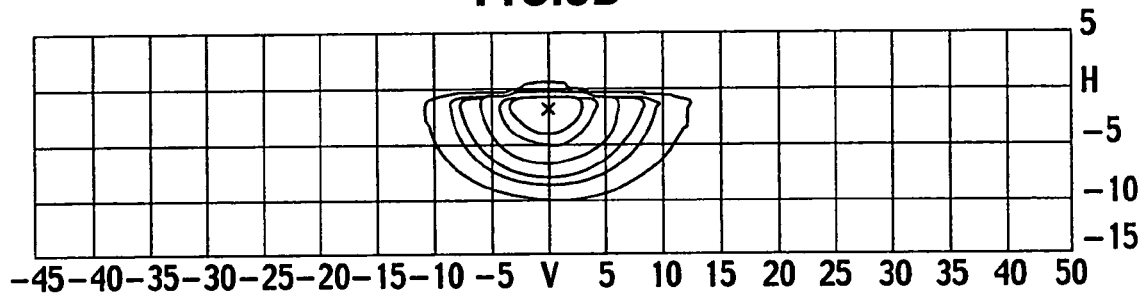
Figure 8C:
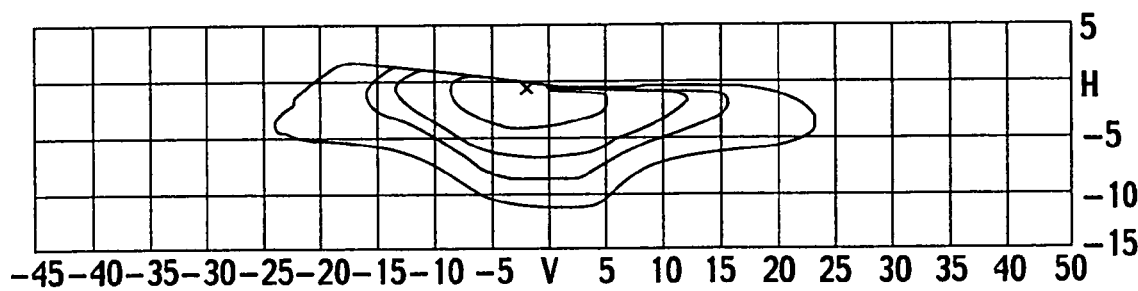
Figure 8D:
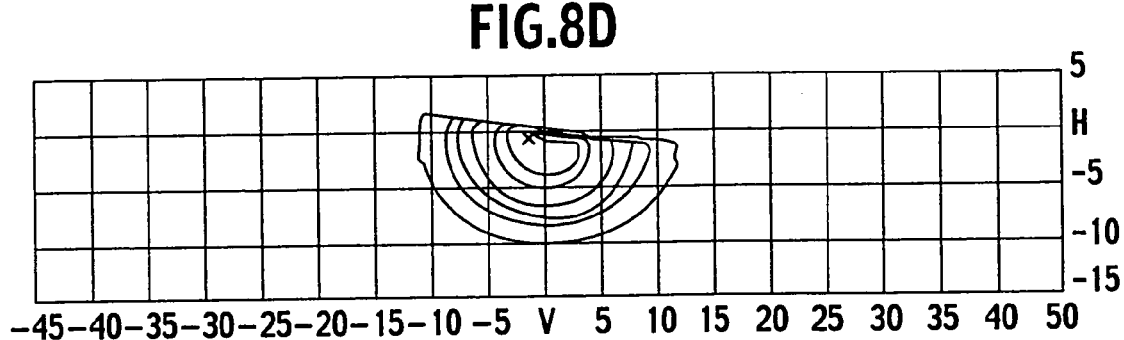
Figure 8E:
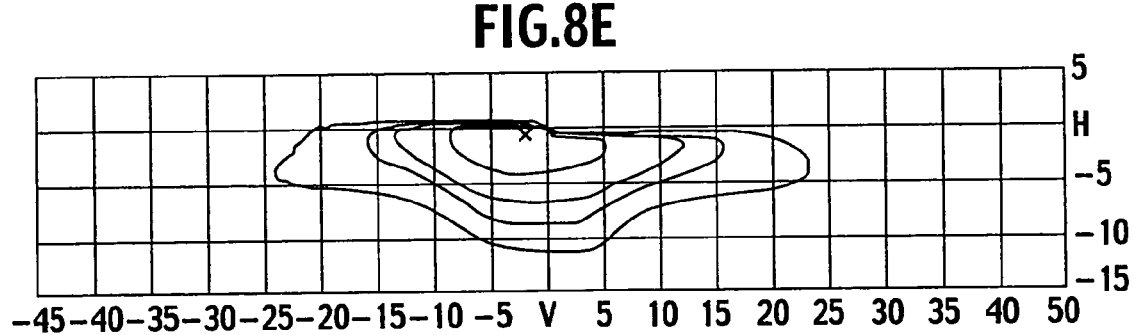
Figure 8F:
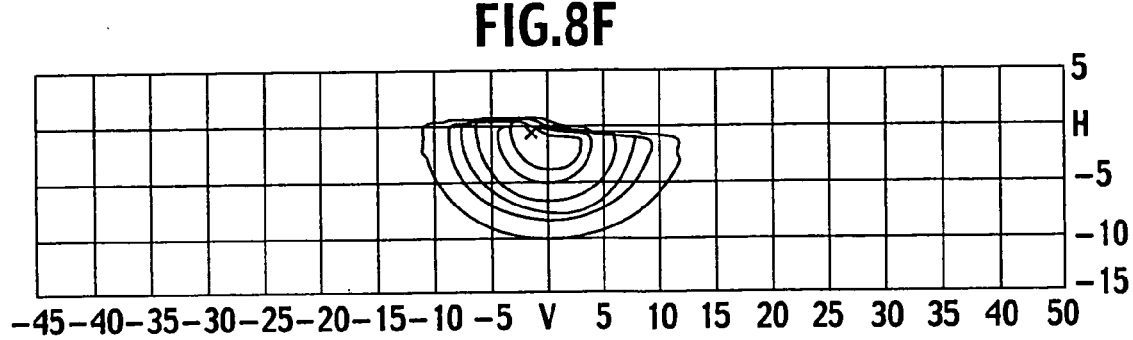
Figure 9A:
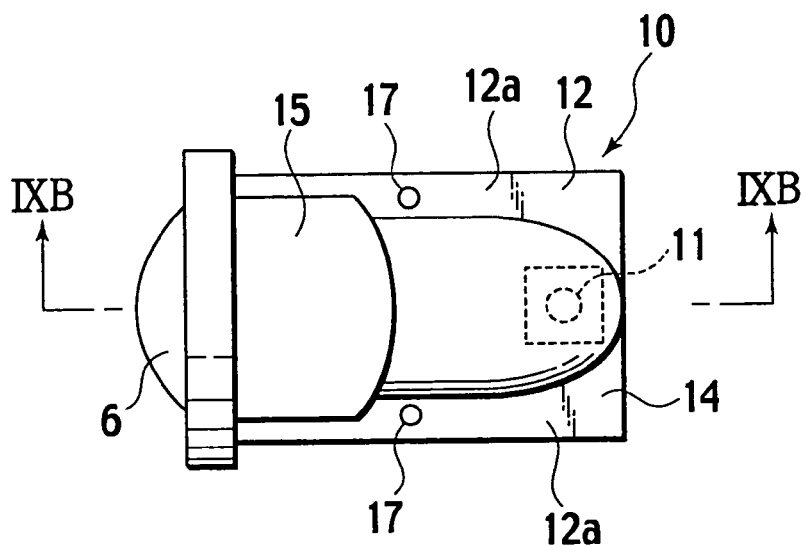
Figure 9B:
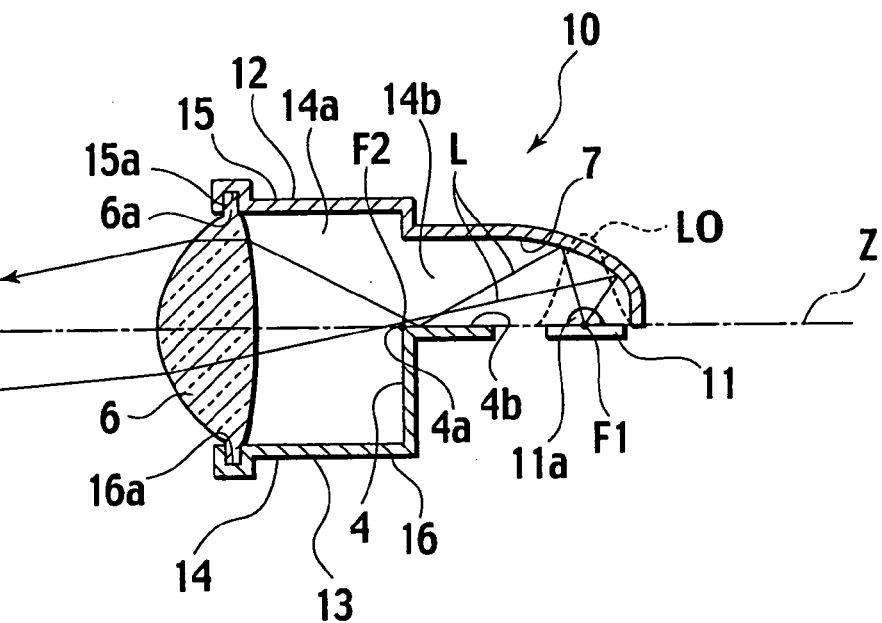
Figure 9C:
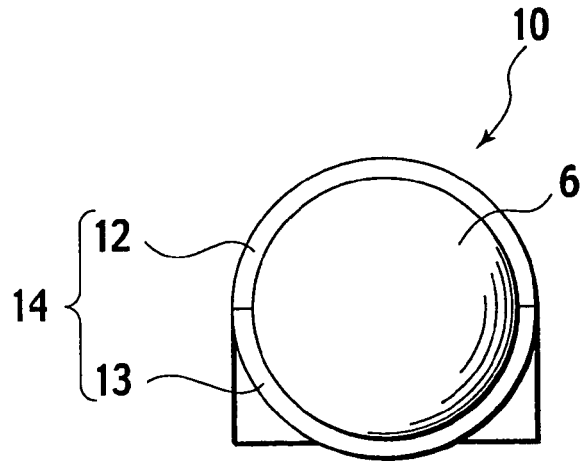
Figure 10:
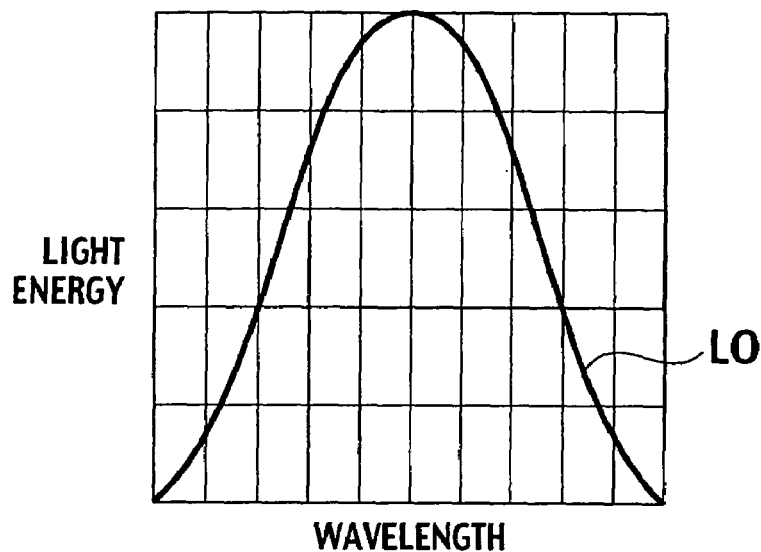
Figure 11:
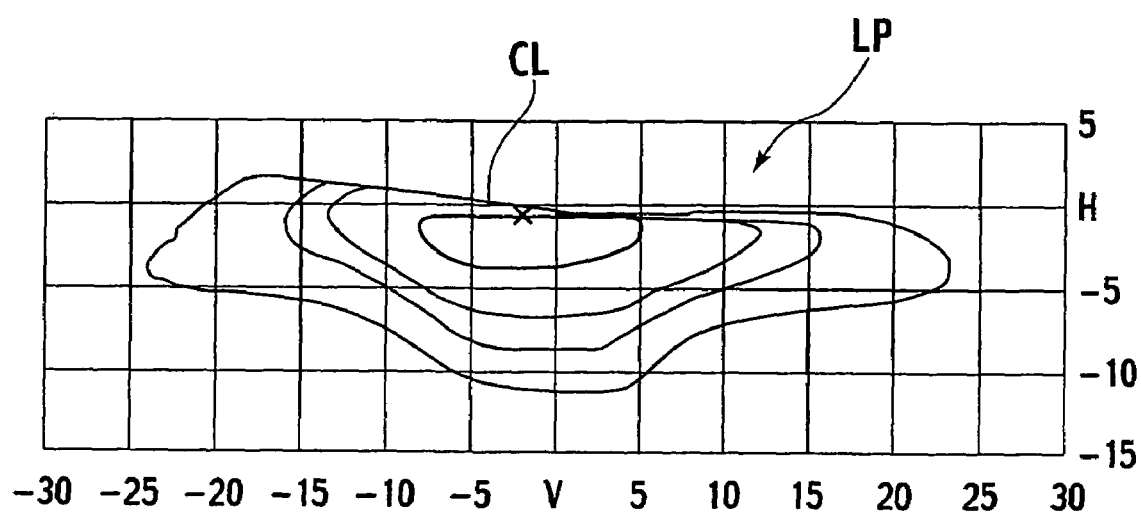
Figure 12:
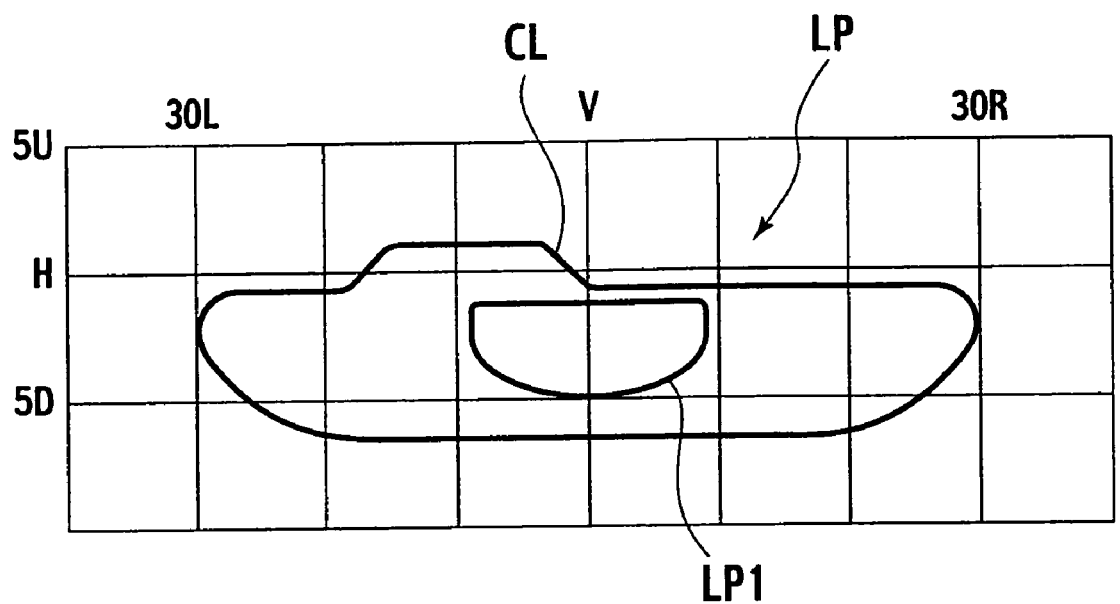
Figure 15:
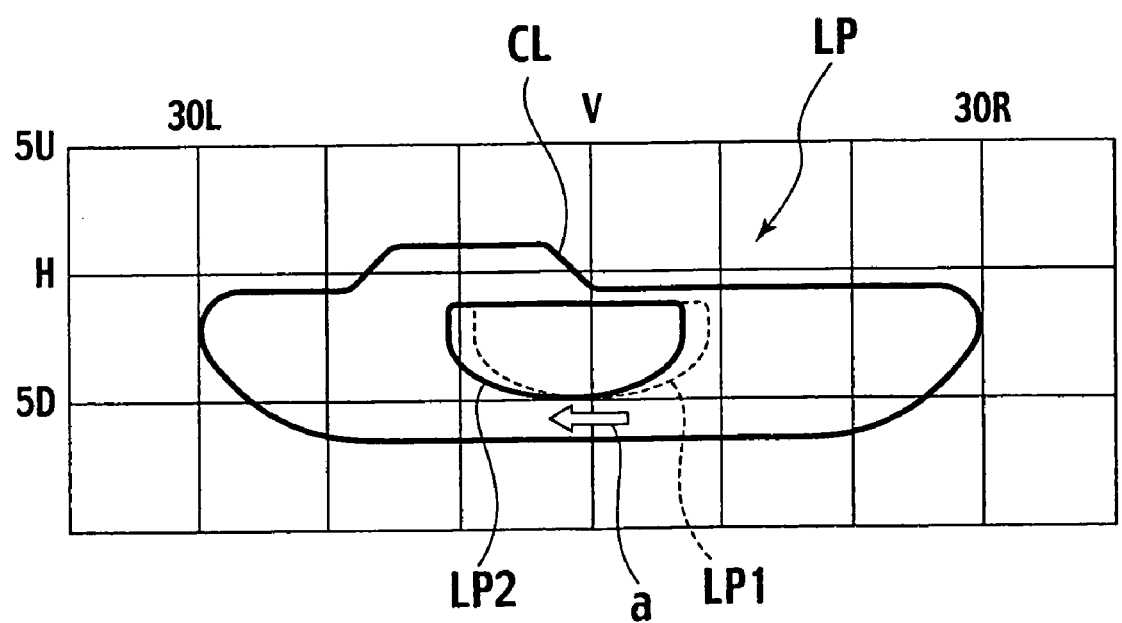
Figure 13A:
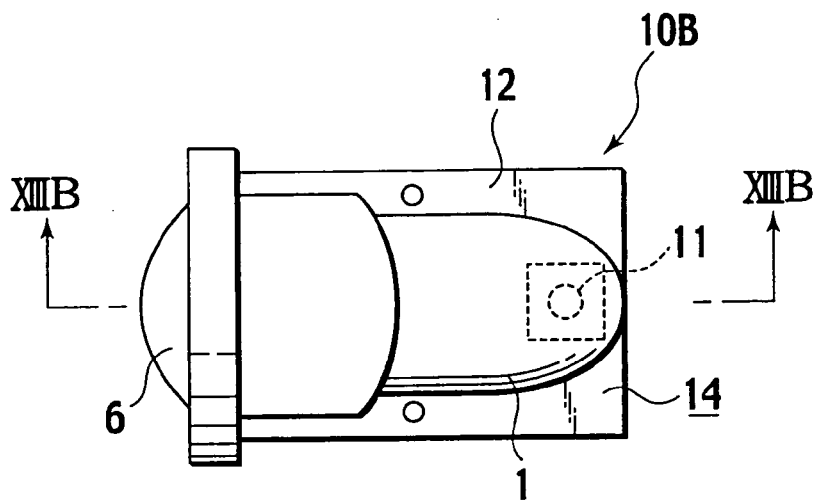
Figure 13B:
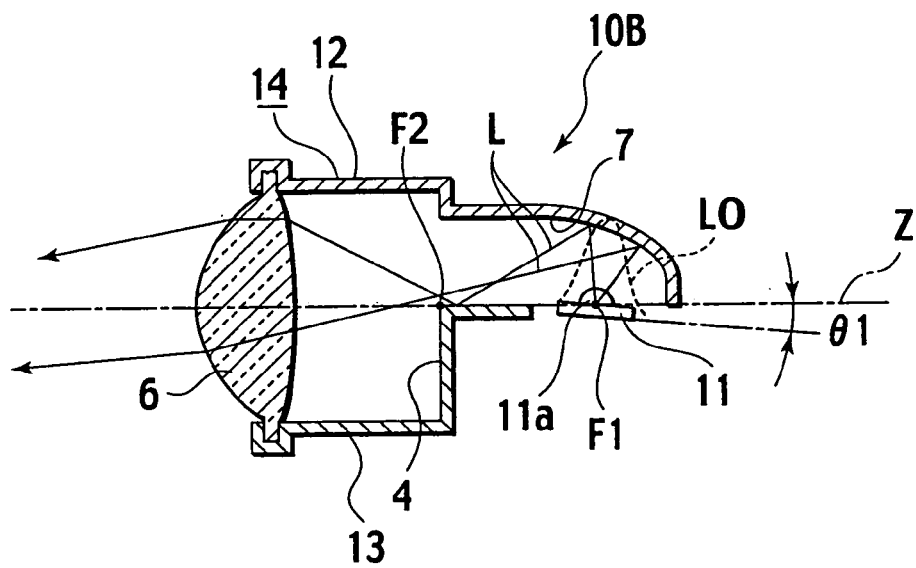
Figure 13C:
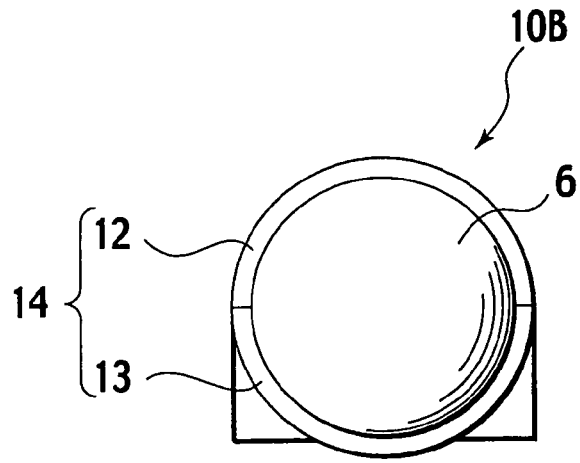
Figure 17A:
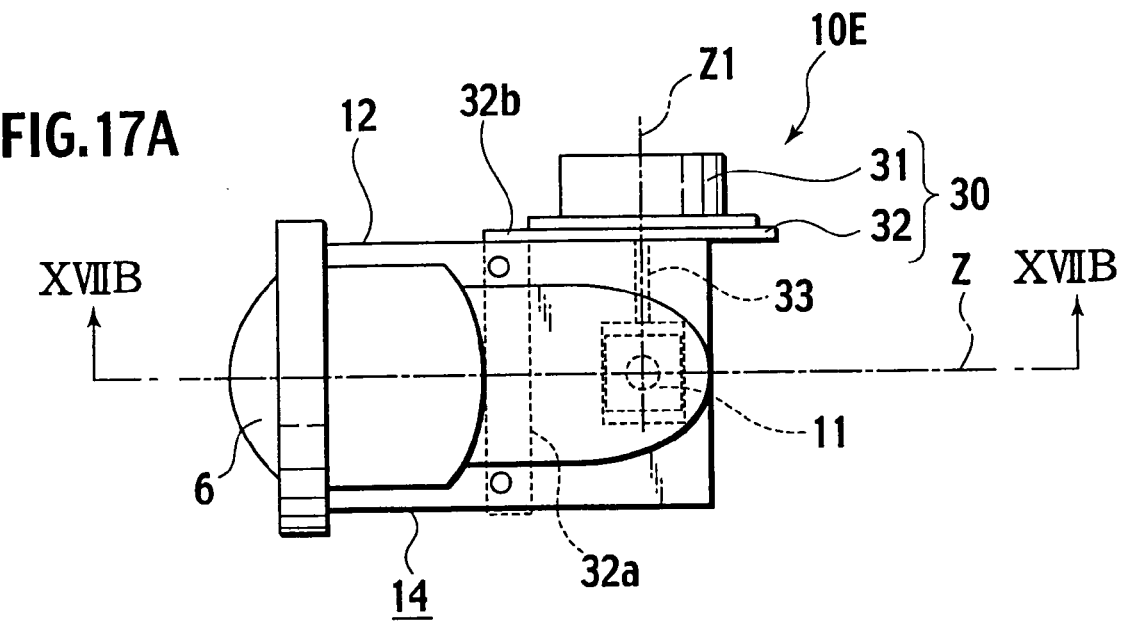
Figure 17B:
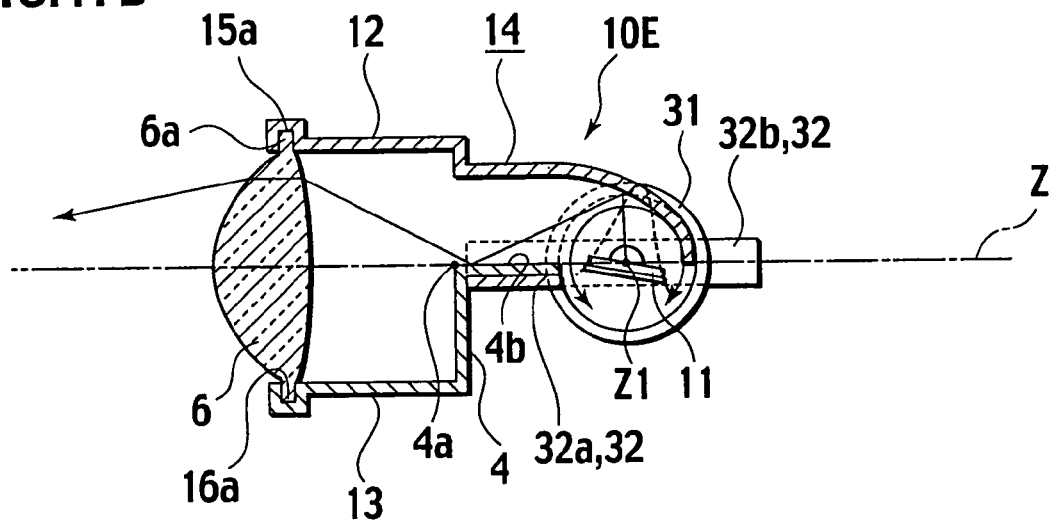
Figure 17C:
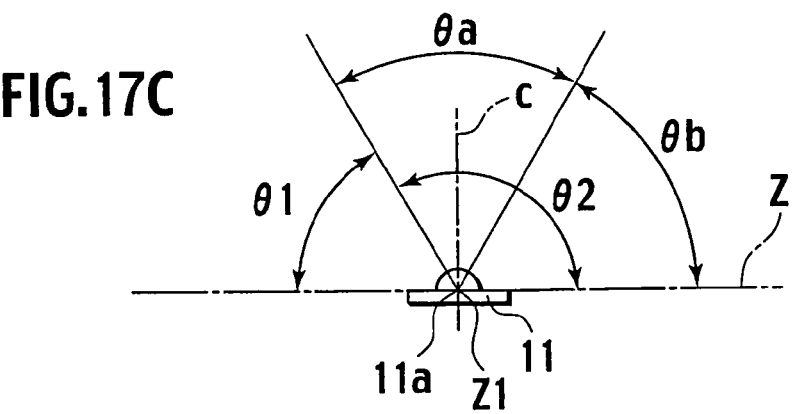
Figure 18A:
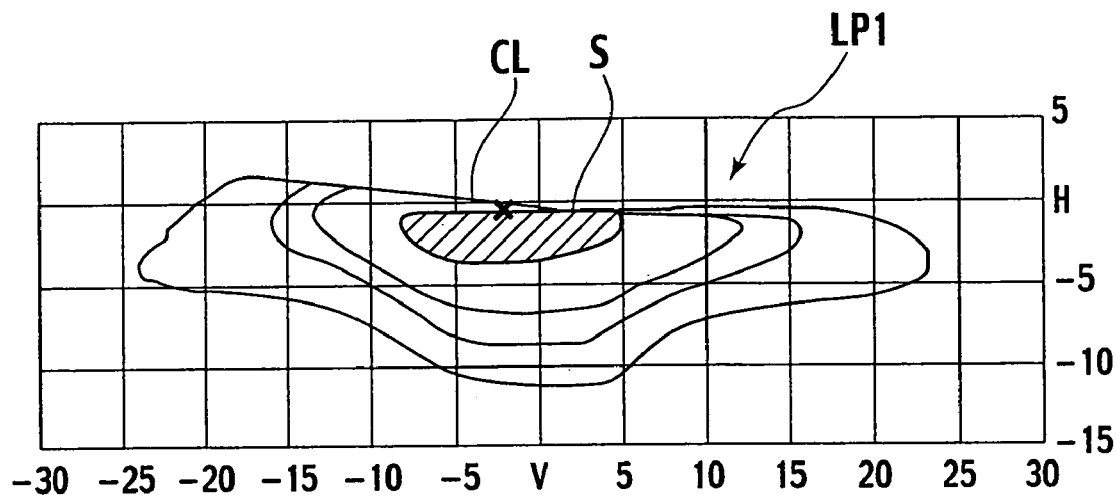
Figure 18B:
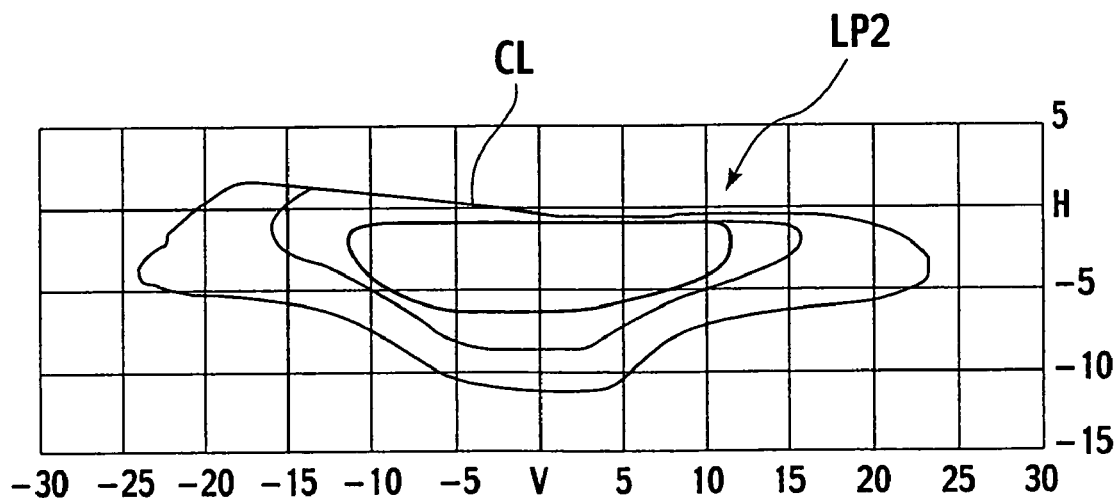
Figure 19A:
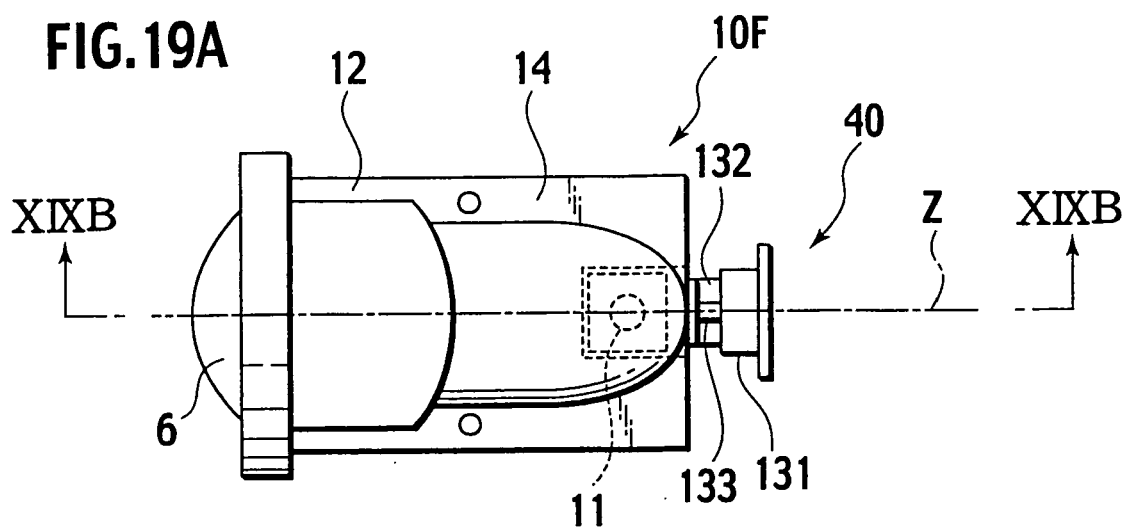
Figure 19B:
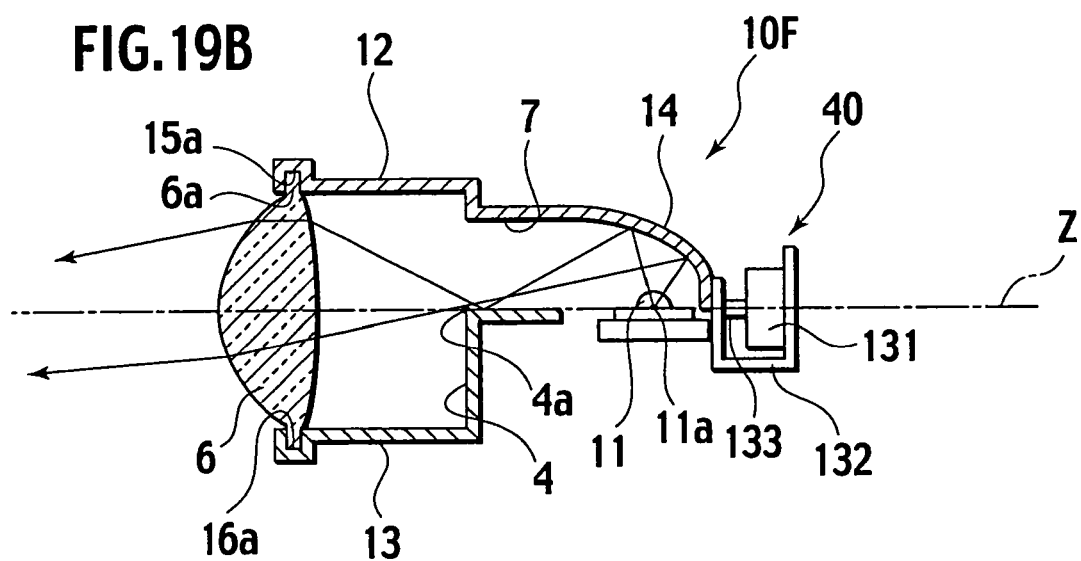
Figure 19C:
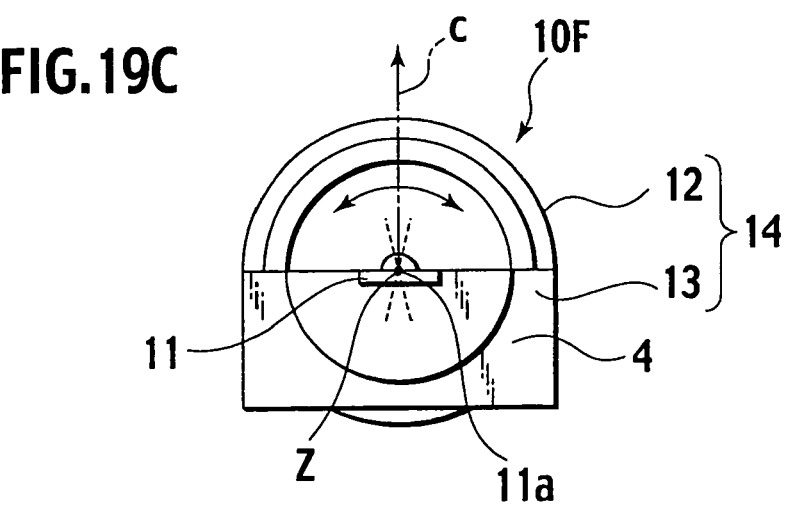
Figure 20:
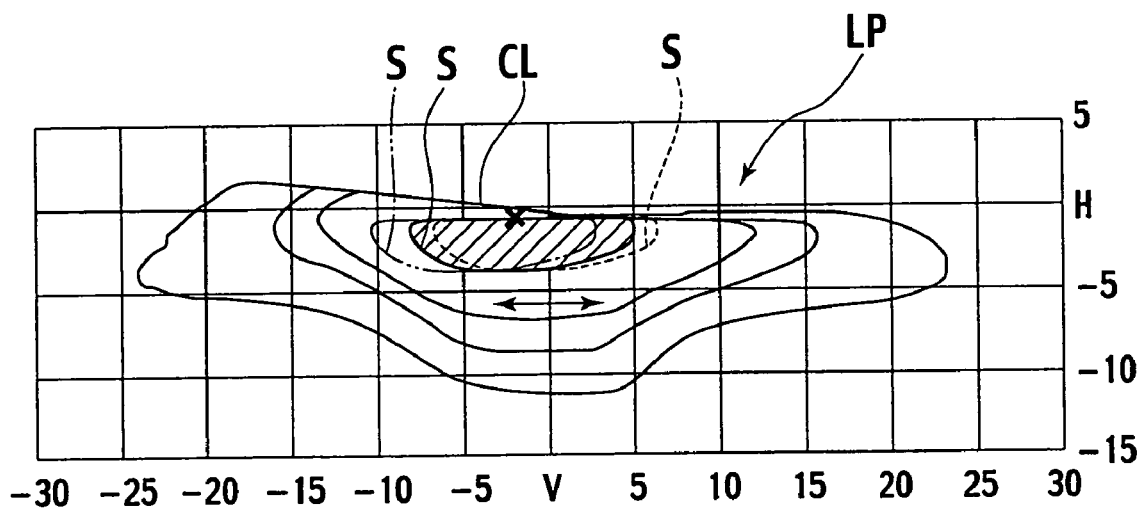

FIGS. 8A to 8F illustrate examples of the pattern of lighting emitted from an array of the small projector type lamps in the projector type vehicle light shown in FIG. 3; FIG. 8A represents a horizontally dispersed pattern, FIG. 8B represents a converged flat pattern, FIGS. 8C and 8E represent horizontally dispersed pattern defined by a cut-off line for passing through at the left, and FIGS. 8D and 8F represent converged flat pattern defined by a cut-off line for passing through at the left;

FIGS. 9A to 9C illustrate a fundamental structure of the small projector type lamp in the projector type vehicle light of the present invention; FIG. 9A is a plan view, FIG. 9B is a cross sectional view taken along the line IXB—IXB of FIG. 9A, and FIG. 9C is a front view thereof;

FIG. 10 is a graphic diagram showing a profile of the output of light emitted from the LED of the small projector type lamp shown in FIGS. 9A to 9C;

FIG. 11 is a graphic diagram showing an example of the pattern of lighting emitted from the small projector type vehicle light including the small projector type lamp shown in FIGS. 9A to 9C;

FIG. 12 is a graphic diagram showing an example of the pattern of lighting emitted from the small projector type vehicle light including the small projector type lamp 10;

FIG. 13A to 13C illustrate a multi-function small projector type lamp in the second embodiment of the projector type vehicle light of the present invention; FIG. 13A is a plan view, FIG. 13B is a cross sectional view taken along the line XIIIB—XIIIB of FIG. 13A, and FIG. 13C is a side view of the small projector type lamp;

FIG. 14A to 14D illustrate a multi-function small projector type lamp in the first embodiment of the projector type vehicle light of the present invention; FIG. 14A is a plan view, FIG. 14B is a cross sectional view taken along the line XIVB—XIVB of FIG. 14A, FIG. 14C is a side view thereof and FIG. 14D is an explanatory view showing a tilting range of the LED;

FIG. 15 is a graphic diagram showing an example of the pattern of lighting emitted from the fourth embodiment of the projector type vehicle light;

FIG. 16A to 16D illustrate a multi-function small projector type lamp in the first embodiment of the projector type vehicle light of the present invention; FIG. 16A is a plan view, FIG. 16B is a cross sectional view taken along the line XVIB—XVIB of FIG. 16A, FIG. 16C is a side view thereof and FIG. 16D is an explanatory view showing a shifting status of the LED;

FIGS. 17A to 17C illustrate a multi-function small projector type lamp in the first embodiment of the projector type vehicle light of the present invention; FIG. 17A is a plan view, FIG. 17B is a cross sectional view taken along the line XVIIB—XVIIB of FIG. 17A, and FIG. 17C is an explanatory view showing a tilting range of the LED;

FIGS. 18A and 18B illustrate examples of the pattern of lighting emitted from the first embodiment of the projector type vehicle light; FIG. 18A represents a spot centered pattern, and FIG. 18B represents a spotless pattern;

FIGS. 19A to 19C illustrate a multi-function small projector type lamp in the second embodiment of the projector type vehicle light of the present invention; FIGS. 19A is a plan view, FIG. 19B is a cross sectional view taken along the line XIXB—XIXB of FIG. 19A, and FIG. 19C is an explanatory front view showing a tilting range of the LED; and FIG. 20 is a graphic diagram showing an example of the pattern of lighting emitted from the second embodiment of the projector type vehicle light.

DESCRIPTION OF THE PREFERRED EMBODIMENTS

The present invention will be described in the form of preferred embodiments.

Figure 4:
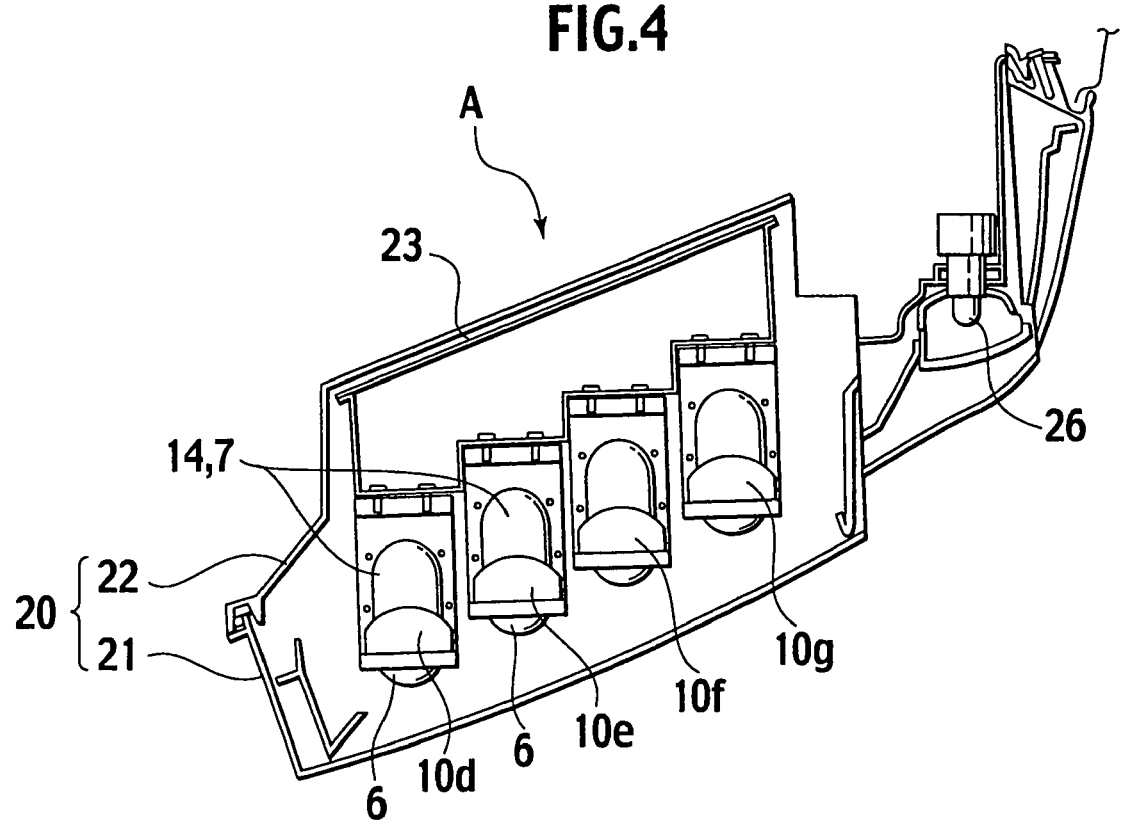
FIG. 4 is a cross sectional view of the projector type vehicle light taken along the line IV—IV of FIG. 3.
Figure 5:
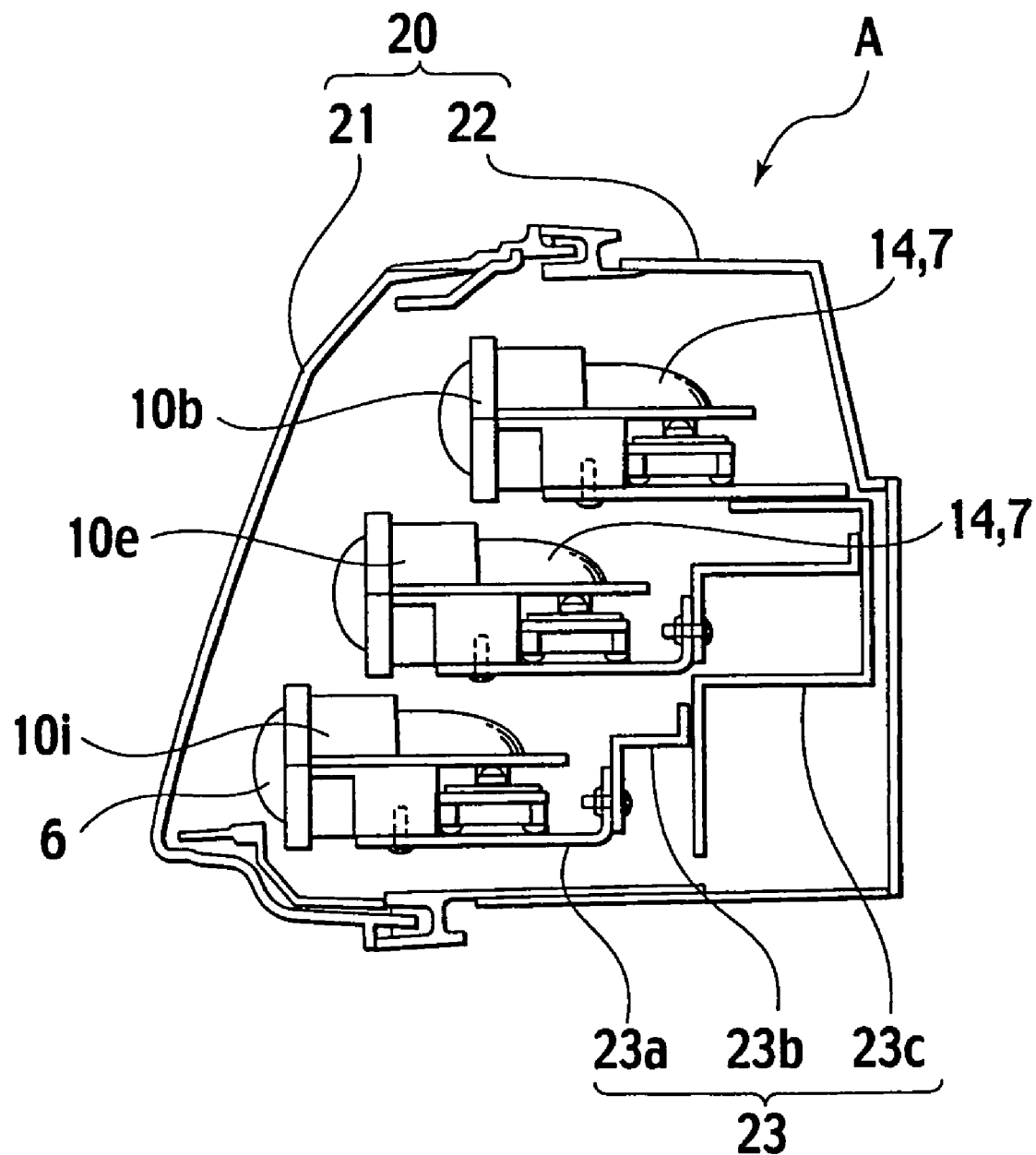
FIG. 5 is a cross sectional view of the projector type vehicle light taken along the line V—V of FIG. 3.

FIGS. 3 to 5 illustrate a projector type vehicle light A according to the present invention. The vehicle light A comprises substantially an array of small projector-type lamps 10a, 10b, 10c, 10d, 10e, 10f, 10g, 10h, 10i, and 10j arranged of which the light sources 11 are LEDs and mounted in a housing 20.

The housing 20 consists mainly of a casing 22 having an opening provided in the front thereof and a transparent glass 21 mounted to shut up the opening of the casing 22. The small projector type lamps 10a to 10j are fixedly mounted to the housing 20 by a mounting member 23 to the casing 22. The mounting member 23 is arranged adjustable with two unshown adjusting screws extending through a pivotal structure thereof so that the small projector type lamps 10a to 10j can be displaced in four, leftward, rightward, upward, and downward, directions in relation to the casing 22. Denoted by 26 and 27 in FIGS. 3 and 4 are a clearance lamp and a front turn lamp.

The small projector type lamps 10a to 10j function in a combination as a headlamp and its pattern of light can be determined by modifying the location.

FIG. 8A illustrates a horizontally dispersed flat pattern (the first pattern), FIG. 8B illustrates a converging flat pattern (the second pattern), FIGS. 8C and 8E illustrate horizontally dispersed pattern defined by the cut-off line for ease of the passing through (the third pattern), and FIGS. 8D and 8F illustrate converged pattern defined by the cut-off line for ease of the passing through (the fourth pattern).

Correspondingly, the small projector type lamps 10a to 10j are arrayed in such a manner that the third pattern of lighting shown in FIG. 8C is illuminated by a group of the lamps 10a, 10c, 10d, and 10g, the fourth pattern of lighting shown in FIG. 8D is illuminated by a group of the lamps 10b, 10e, and 10f, and the first pattern of lighting shown in FIG. 8A is illuminated by a group of the lamps 10h, 10i, and 10j. In common, the vehicle light A creates a pattern of lighting LP defined by the cut-off line CL for ease of the passing through as shown in FIG. 11. It should be noted that a typical of the small projector type lamps 10a to 10j is denoted hereinafter by 10, 10B, 10C, 10D, 10E or 10F.

FIGS. 9A to 9C illustrate the fundamental structure of each small projector type lamp 10 according to a first embodiment of the present invention. The small projector type lamp 10 has an LED 11 provided as the light source to locate close to the primary focusing point F1 of a small concave mirror 7 in a small reflector 14 and face at its emitter side 11a the small concave mirror 7, the small reflector 14 having an ellipsoidal surface of rotation or a free surface as a part of the ellipsoidal surface of rotation provided on the inner surface thereof to develop the small concave mirror 7.

A small convex lens 6 is provided to cover the front opening of the small reflector 14. The smaller reflector 14 and the small convex lens 6 are made of resin materials. The small convex lens 6 may have non-spherical surfaces at both sides thereof (See FIGS. 6 and 9B). The resin materials may be selected from poly carbonate resin and acrylic resin. Preferably, the small convex lens 6 is made of an acrylic resin material which has better optical characteristics.

The small reflector 14 is desirably made of resin materials as described above, it is possible that the small reflector 14 would be made of metal.

The small reflector 14 comprises an upper reflector 12 formed integral with the small concave mirror 7 and a lower reflector 13 formed integral with a shade 4 which has a folded edge portion 4a extending along the meridional plane and a reflective portion 4b extending rearwardly from the top of the folded edge portion 4a in substantially the horizontal and joined from below to the upper reflector 12.

More specifically, the small concave mirror 7 is provided at the rear half of the upper reflector 12 and joined continuously with an upper casing which is provided at the front half of the upper reflector 12 and greater in the diameter than the small concave mirror 7. The upper reflector 12 is coated at the inner surface with a reflective material by vapor deposition.

The lower reflector 13 is composed of the shade 4 and a lower casing 16. As shown in FIG. 9B, the shade 4 having an inverted L shape in the cross section is joined upright to the rear end of the lower casing 16 so that its folded edge portion 4a extends along the meridional plane. The shade 4 is coated at the inner surface with the reflective material by vapor deposition to ensure the reflector function of its reflective portion 4b.

The folded edge portion 4a may be configured to determine the cut-off line shown in FIGS. 8C, 8D, 8E or 8F when the third or fourth pattern of lighting is desired. It may be arranged horizontally to determine the first or second pattern of lighting as shown in FIG. 8A or 8B. Also, the LED 11 is arranged substantially vertical when the first or second dispersed pattern of lighting shown in FIG. 8A, 8C or 8E is desired. It is tilted rearwardly when the second or fourth converged pattern of lighting shown in FIG. 8B, 8D or 8F is desired.

The two reflectors 12 and 13 of the small reflector 14 are joined to each other with their flange portions 12a and 13a abutting together and tightened by joining means.

More particularly, the upper reflector 12 and the lower reflector 13 of the small reflector 14 are positioned so that the folded edge portion 4a comes close to the secondary focusing point F2 of the small concave mirror 7 and the small convex lens 6 is sandwiched between the two reflectors 12 and 13 at the front end.

Figure 6:
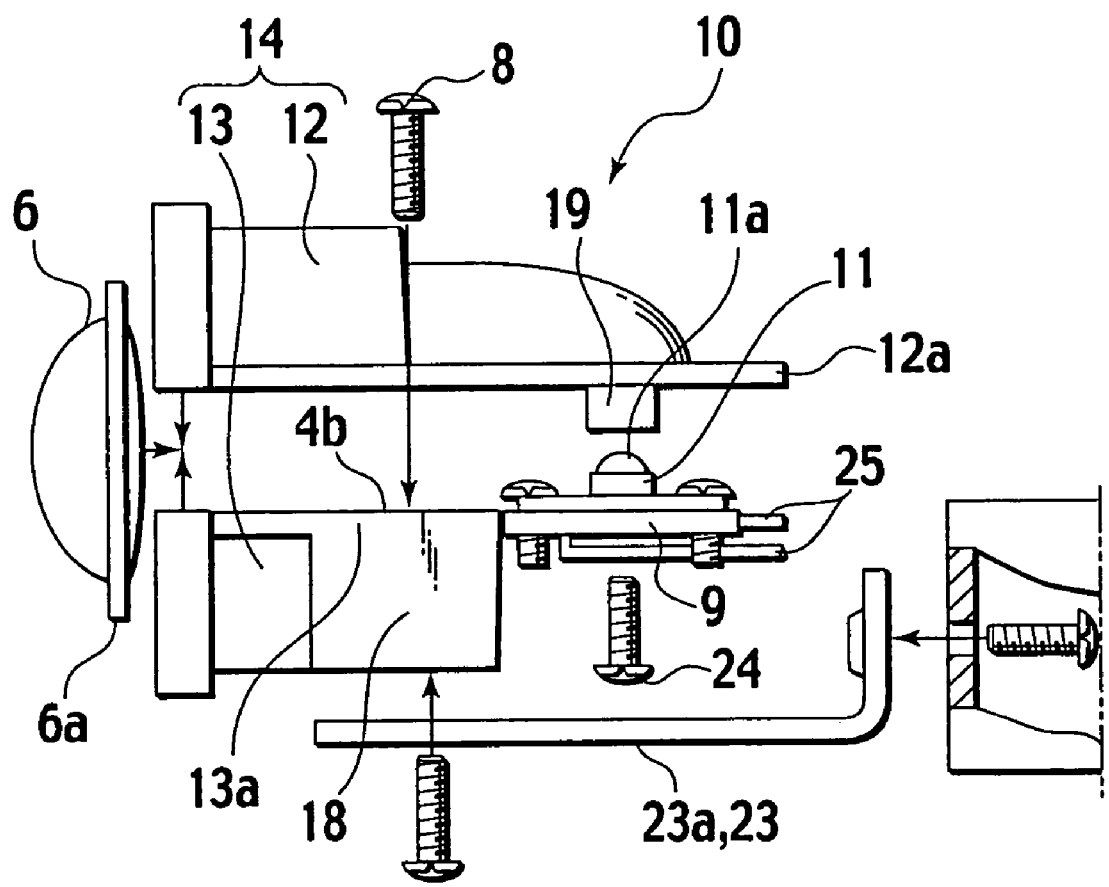
FIG. 6 is an exploded perspective view of a small projector type lamp for use in the projector type vehicle light shown in FIG. 3.

The joining means are, as shown in FIGS. 6 and 9A, screws 8, screw holes 17 provided in the flange portion 12a of the upper reflector 12, and boss portions 18 formed integral with the lower reflector 13. With the screws 8 passing through the screw holes 17 (see FIG. 9A) and threaded into the boss portions 18 (See FIG. 6), the two reflectors 12 and 13 are coupled to each other.

Defined at substantially the front half of the small reflector 14 by the two casings 15 and 16 is a front lamp chamber 14a. Also, a rear lamp chamber 14b at the rear half of the small reflector 14 is defined at the front closed region by the small concave mirror 7 and the reflective portion 4b of the shade 4 and at the rear region in the semi-spherical cross section by the small concave mirror 7.

The small reflector 14 is combined with the LED 11, which is provided at the rear portion of the rear lamp chamber 14b of the upper reflector 12 with its emitter side 11a facing the small concave mirror 7, thus developing the small projector type lamp 10. It is essential in the fundamental structure of the small projector type lamp 10 that the emitter side 11a of the LED 11 is positioned close to the primary focusing point F1 of the small concave mirror 7.

Figure 7:
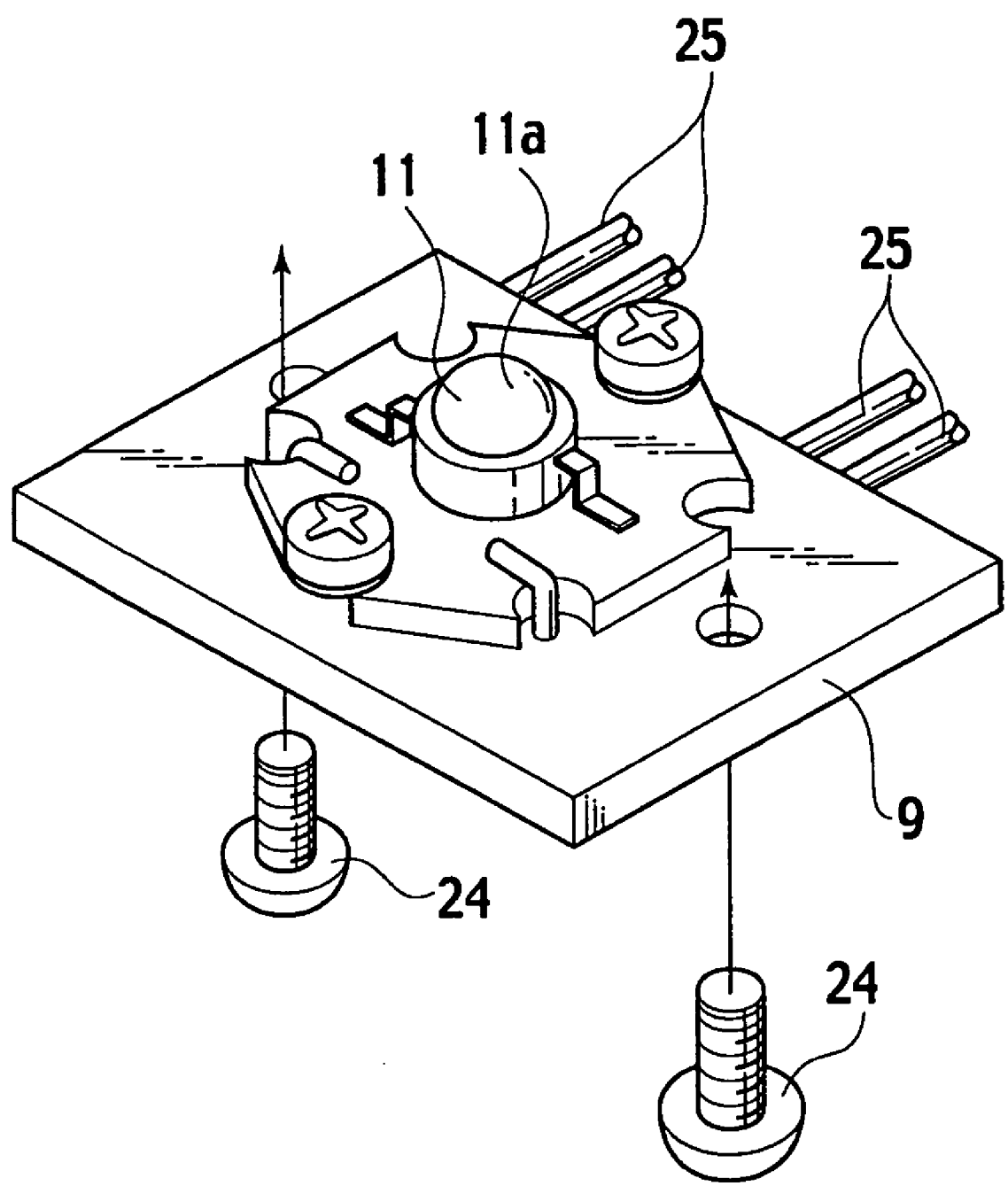
FIG. 7 is a perspective view of a sub assembly of an LED used as the light source in the small projector type lamp shown in FIG. 6.

The LED 11 is fixedly mounted to a mount plate 9 to form a sub assembly as shown in FIGS. 6 and 7. The mount plate 9 is then joined by screws 24 to light source bases 19 provided at the rear end of the rear half of the upper reflector 12 so that the emitter side 11a of the LED 11 faces the small concave mirror 7. As the LED 11 is joined by the light source bases 19 to the upper reflector 12, its emitter side 11a stays close to the primary focusing point F1 of the small concave mirror 7. As best shown in FIG. 6, the light source bases 19 are boss regions at the back side of the flange portion 12a on both sides of the small concave mirror 7, each having a thread hole in the center thereof. Denoted by 25 in FIGS. 6 and 7 are four lead lines, two for the LED 11 and the other two for a cooling element.

FIG. 10 illustrates a profile of the pattern of lighting L0 emitted from the emitter side 11a of the LED 11. The broken line shown in FIG. 9B represents an incident profile of the pattern of lighting L0 on the small concave mirror 7.

The vehicle light A creates a pattern of lighting LP defined by the cut-off line CL for ease of the passing through as shown in FIG. 12, especially, a hot zone LP1 of the pattern of lighting LP is located at the middle portion of the pattern of lighting LP.

Referring now to FIGS. 13A~16D, a second to a fourth embodiments according to the present invention will be described hereinbelow.

FIGS. 13A to 13C illustrate the small projector type lamp 10B according to the second embodiments.

In action, the LED 11 in the small projector type lamp 10B can be tilted and inclined backward about (around) F1. In other words, a light emitting potion of the LED is inclined so as to be lowered in the backward direction of the small concave mirror 7, as shown in FIG. 13B. The tilting movement may be set to an angular range of θ1.

When the LED 11 of the small projector lamp 10B is tilted through the backward movement θ1 as shown in FIG. 13B, it projects the pattern of lighting LP1 having the spot S (See FIG. 18A).

FIGS. 14A to 14D illustrate a small projector type lamp 10C which is multi-functioned for modifying the pattern of light and used in a vehicle light C of the third embodiment.

The vehicle light C of the third embodiment is featured in which at least one of the small projector type lamps 10a to 10j (FIG. 3) is replaced by a small projector type lamp 10C while the others are constructed in the fundamental structure of the small projector type lamp 10. The small projector type lamp 10C is designed with the LED 11 arranged tiltable about the optical axis Z so as to be set with an angle θ2 as shown in FIG. 14D.

As the small projector type lamp 10C is designed for multi-function, it replaces at least one of the small projector type lamps 10a to 10j in the vehicle light A (See FIG. 3).

The small projector type lamp 10C is designed with the LED 11 arranged tiltable about the optical axis Z thereof for moving the spot S (denoted by the hatching in FIG. 15) in the pattern of lighting LP to the left and the right as denoted by the arrows in FIG. 15, namely, the hot zone LP2 is offset and shifted leftward from the previous hot zone LP1 in a direction of the arrow a.

Therefore, the small projector type lamp 10C is improved in the intensity of light emitting through the hot zone of a desired pattern with the reflectivity of its concave mirror increased to maximum, especially be useful for driving on a load to keep right end.

FIGS. 16A to 16D illustrate a small projector type lamp 10D which is multi-functioned for modifying the pattern of light and used in a vehicle light B of the fourth embodiment.

The vehicle light B of the fourth embodiment is featured in which at least one of the small projector type lamps 10a to 10j (FIG. 3) is replaced by a small projector type lamp 10D while the others are constructed in the fundamental structure of the small projector type lamp 10. The small projector type lamp 10D is offset in a leftward or rightward direction of an orthogonal axis Z1 extending at a right angle to the optical axis Z of the small projective type lamp 10D.

Therefore, the maximum lighting degree of the pattern of lighting LP shown in FIGS. 8aA to 8F can be shifted with 1.5 degrees in the leftward or the rightward so that the small projector type lamp 10D is improved in the intensity of light emitting through the hot zone of a desired pattern with the reflectivity of its concave mirror increased to maximum, especially be useful for varying a load to keep right end or a load to keep left end.

Referring now to FIGS. 17A~20, still other embodiments of the present invention will be described hereinbelow.

The vehicle light B of a fifth embodiment according to the present invention is featured in which at least one of the small projector type lamps 10a to 10j is replaced by a small projector type lamp 10E while the other lamps 10 remain unchanged as constructed in the fundamental structure. The small projector type lamp 10E is designed for switching between a pattern of lighting LP1 shown in FIG. 18A having a spot S (denoted by the hatching in FIG. 18A) and a pattern of lighting LP2 shown in FIG. 18B having no spot while its LED 11 is arranged pivotable about an orthogonal axis Z1 extending at a right angle to the optical axis Z thereof.

The switching of the vehicle light B is automatically controlled during the vehicle driving operation on road by appropriate actuator and control means.

As the small projector type lamps 10E are multi-functioned for modifying the pattern of lighting, they replace at least one or more of the small projector type lamps 10a to 10j in the vehicle light A (See FIG. 3).

In this embodiment, the two small projector type lamps 10e and 10f are replaced by the multi-functioned small projector type lamps 10E while the other lamps 10a to 10d and 10g to 10j remain unchanged as constructed in the fundamental structure of the small projector type lump 10.

FIGS. 17A to 17C illustrate the small projector type lamp 10E according to a fifth embodiment of the invention. The small projector type lamp 10E is differentiated by the provision of a driving means 30 for moving the LED 11 and its other arrangement is identical to that of the small projector type lamp 10.

The driving means 30 comprises an actuator 31 joined by an output shaft 33 to the sub assembly of the LED 11 and a bracket 32 secured to the small reflector 14 for supporting the actuator 31.

The bracket 32 in this embodiment comprises a mounted portion 32a fixedly mounted to the back side of the reflective portion 4b of the shade 4 and a supporting portion 32b folded at a right angle to one end of the mounted portion 32a to extend along one side of the upper reflector 12.

The actuator 31 is fixedly mounted to the supporting portion 32b of the bracket 32 secured to the reflector 14 and its output shaft 33 extends along the orthogonal axis Z1 at a right angle to the optical axis Z of the small projector type lamp 10 to the interior of the upper reflector 12. The output shaft 33 is joined at the distal end to the sub assembly of the LED 11. The orthogonal axis Z1 intersects at a right angle with the optical axis Z on the horizontal plane.

In action, the LED 11 in the small projector type lamp 10E can be tilted forward and backward about the orthogonal axis Z1 by the action of the actuator 31 as denoted by the arrow in FIG. 17B. The tilting movement may be set to an angular range of θ2 (120 degrees) excluding the forward range of θ1 as shown in FIG. 17C. The angular range of θ2 is divided into a forward tilting movement θa and a backward tilting movement θb of the LED 11. The tilting movement of the LED 11 means the movement of the vertical axis c which extends across the emitter side 11a of the LED 11, as shown in FIG. 17C.

As the vehicle light B (A) includes the small projector type lamps 10 and 10E as the array of the lamps 10a to 10j, its mounting member 23 comprises a first mounting member, 23a, a second mounting member 23b, and a third mounting member 23c, whereby the small projector type lamps 10 and 10E are mounted by the mounting members 23a, 23b, and 23c to the casing 22 with their small convex lenses 6 arranged opposite to the transparent glass 21 and their upper and lower reflectors 12 and 13 coupled together from above and below, as shown in FIG. 5 and 6.

In an action of the vehicle light B (A), light L emitted from the LED 11 of each small projector type lamp 10 or 10E is directed through, as shown in FIG. 9B, the emitter side 11a to the small concave mirror 7. As the light reflected by the small concave mirror 7 is focused to the secondary focusing point F2 of the small concave mirror 7 at the shape 4, its component is reflected by the reflective portion 4b of the shade 4 while the other component is blocked by the shade 4. The component of the light is thus projected forward from the vehicle light A to create the pattern of lighting LP defined by the cut-off line CL (See FIG. 11).

When the LED 11 of the small projector lamp 10E is tilted through the backward movement θb shown in FIG. 17C, it projects the pattern of lighting LP1 having the spot S (See FIG. 18A). When the LED 11 is in the forward movement θa shown in FIG. 17C, it projects the pattern of lighting LP2 having no spot (See FIG. 18B). The pattern of lighting LP can be switched in this manner. When the LED 11 is about the interface between the forward movement θa and the backward movement θb, its pattern of lighting is not clearly switched but remains at an intermediate level throughout a broad intermediate range including the interface.

The driving means 30 may be actuated by hand or systematically depending on a variety of information including the condition of a road, the information of a map, and the state of a running vehicle. This can switch the pattern of lighting to an optimum mode for the running vehicle.

The shade 4 of the small projector type lamps 10 and 10E in the vehicle light A has its reflective portion 4b arranged substantially horizontal and allows the light reflected by the small concave mirror 7 to be projected forward at higher efficiency by the action of the reflective portion 4b. Accordingly, the intensity of light projected from the small convex lens 6 can be increased hence improving the effectiveness of illumination.

Also, the small concave mirror 7 in the vehicle light A needs to be provided with no through apertures for controlling the temperature and its reflectivity can be optimized.

Accordingly, the effectiveness of illumination at the spot S will be improved in combination with the action of the reflective portion 4b of the shade 4.

Figure 1:
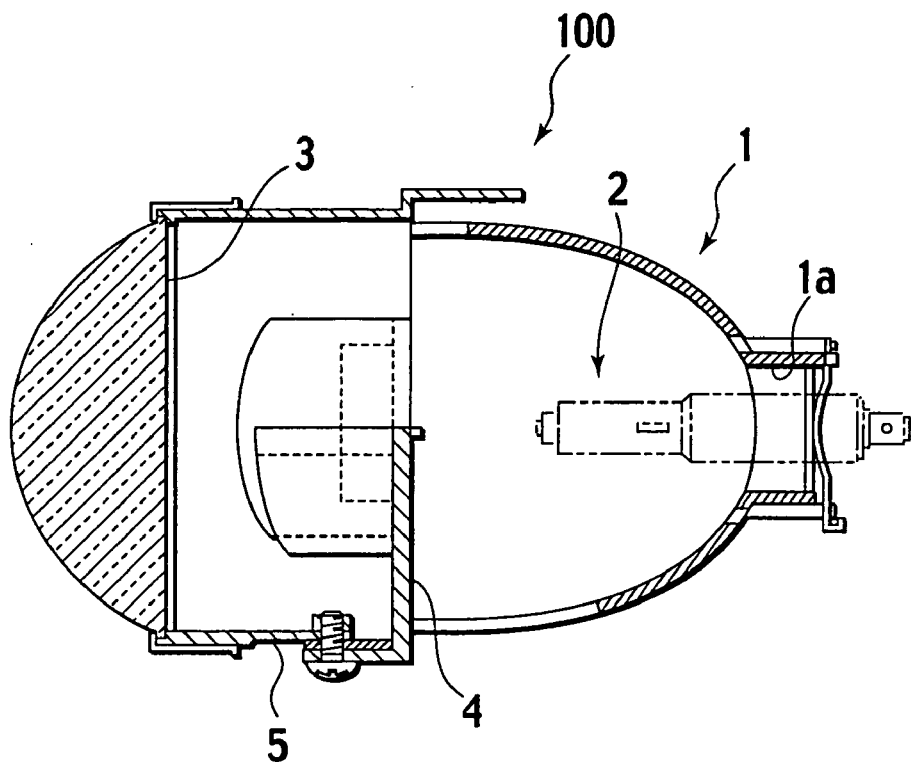
FIG. 1 is a longitudinally cross sectional center view of a conventional projector type vehicle light.
Figure 2:
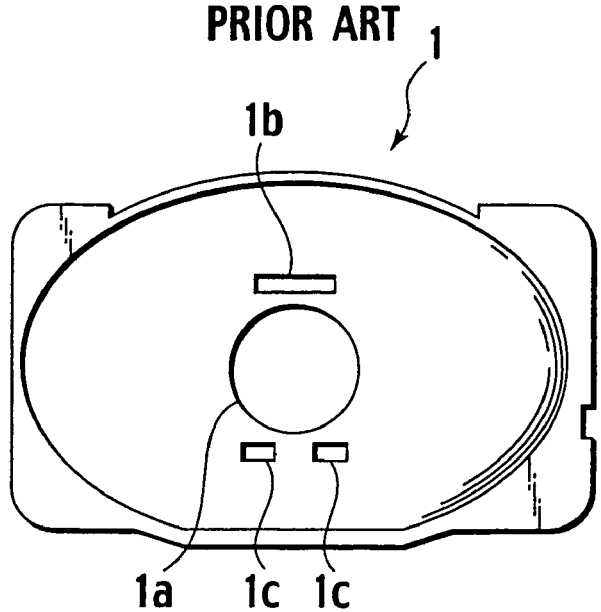
FIG. 2 is a front view of a concave mirror used in the projector type vehicle light shown in FIG. 1.

The LED 11 or the light source in the vehicle light A is minimized in the size thus to ensure the space saving and reduce the installation of the small reflector 14. In addition, the thermal energy of the output of light L from the LED 11 is smaller than that of a filament-based light source (See a light bulb 2 in FIG. 1) thus preventing the lamp chamber from increasing the temperature. Also, with its small convex lenses 6 and small reflectors 14 made of resin materials, the vehicle light A can be minimized in the overall size and reduced in the weight.

The small convex lenses 6 and the small reflectors 14 in the vehicle light A are made of desired resin materials and can thus be fabricated at a higher precision than those made of steel or aluminum deposited sheets. The small reflectors 14 allows its upper reflector 12 to be formed integral with the small concave mirror 7 and its lower reflector 13 to be formed integral with the shade 4. While the two reflectors 12 and 13 are joined together in tightness, the small convex lens 6, the small concave mirror 7, the LED 11, and the shade 4 can be aligned at higher accuracy in both positional and optical relationships. Accordingly, the small projector type lamps 10 and 10E will be enhanced and stabilized in the optical properties thus contributing to the optical improvement in the vehicle light A.

FIGS. 19A to 19C illustrate a small projector type lamp 10F according to a six embodiment of the present invention which is multi-functioned for modifying the pattern of light and used in a vehicle light B.

The vehicle light B of the second embodiment is featured in which at least one of the small projector type lamps 10a to 10j (FIG. 3) is replaced by a small projector type lamp 10F while the others are constructed in the fundamental structure of the small projector type lamp 10. The small projector type lamp 10F is designed with the LED 11 arranged tiltable about the optical axis Z(X) thereof for moving the spot S (denoted by the hatching in FIG. 20) in the pattern of lighting LP to the left and the right as denoted by the arrows in FIG. 20.

As the small projector type lamp 10F is designed for multi-function, it replaces at least one of the small projector type lamps 10a to 10j in the vehicle light A (See FIG. 3).

In this embodiment, the two small projector type lamps 10e and 10f are replaced by the multi-functioned small projector type lamps 10F while the other lamps 10a to 10d and 10g to 10j remain unchanged as constructed in the fundamental structure described previously.

The small projector type lamp 10F is differentiated by the provision of a driving means 40 for moving the LED 11 and its other arrangement is identical to that of the small projector type lamp 10 of the fundamental structure.

The driving means 40 comprises an actuator 131 joined by an output shaft 133 to the sub assembly of the LED 11 and a bracket 132 secured to the small reflector 14 for supporting the actuator 131.

The bracket 132 in this embodiment is made by a U shaped sheet which is fixedly mounted to the rear end of the upper reflector 12 of the small reflector 14. The actuator 131 is fitted into a U groove provided in the bracket 132 with its output shaft 133 extending along the optical axis Z into the interior of the upper reflector 12. The output shaft 133 is joined at the distal end with the sub assembly of the LED 11.

In action, the LED 11 in the small projector type lamp 10F can be tilted about the optical axis Z to the left and the right by the action of the actuator 31 as denoted by the arrows in FIG. 19C.

In the vehicle light B, the small projector type lamps 10 and 10F are provided as an array of the small projector type lamps 10a to 10j and assembled by mounting members 23 to a housing 20 in the same manner as of the vehicle light A of the previous embodiment.

The vehicle light B can thus provide the same advantages as of the vehicle light A as well as different modes of the pattern of lighting. The pattern of lighting of the vehicle light B will be explained below.

When the LED 11 of each small projector type lamp 10F is tilted about the optical axis Z, it can shift the spot S to the left and the right in the pattern of lighting LP shown in FIG. 20. The pattern of lighting LP shown in FIG. 20 is projected from the array of the small projector type lamps 10a to 10j in the vehicle light B.

More specifically, the spot S denoted (in the hatching) by the real line in FIG. 20 is projected by the small projector type lamp 10F when the emitter side 11a of its LED 11 faces just vertical (in the direction denoted by the arrow c in FIG. 19C). The spot S denoted by the two-dot chain line in FIG. 20 is projected by the small projector type lamp 10F when the emitter side 11a of the LED 11 is tilted to the right from the direction c in FIG. 19C. The spot S denoted by the broken line in FIG. 20 is projected when the emitter side 11a of the LED 11 is tilted to the left from the direction c in FIG. 19C. In this manner, the pattern of lighting LP can be modified to a desired mode.

This allows the vehicle light B to shift the spot S to the left and the right within the pattern of lighting LP by tilting the LED 11 to a desired degree. Accordingly, the pattern of lighting LP can be modified to an optimum mode with its spot S spotted at a desired location.

The driving means 40 may be actuated by hand or systematically depending on a variety of information including the condition of a road, the information of a map, and the state of a running vehicle. This can switch the pattern of lighting to an optimum mode for the running vehicle. The driving means 40 may automatically be actuated in response to the angle of steering, the speed of the vehicle, and the signal of navigation. For example, as the vehicle runs in a curve, the spot S in the pattern of lighting can be projected to follow the curve for steering the visibility.

Preferably, the upper and lower reflectors 12 and 13 of the small reflector 14 in the small projector type lamp 10, 10E, or 10F may be formed integral with a holding means for holding the small convex lens 6.

More particularly, the holding means for holding the small convex lens 6 is a combination of an upper lens holding portion 15a or a slot provided in the inner surface and along the front edge of the upper casing of the upper reflector 12 and a lower lens holding portion or slot 16a provided in the inner surface and along the front edge of the lower casing 16 of the lower reflector 13, as shown in FIGS. 9B, 17B, and 19B.

The small convex lens 6 has an annular thin flange 6a provided at the rim thereof and is installed between the two reflectors 12 and 13 with the flange 6a fitted into the holding slots 15a and 16a.

This allows the small convex lens 6 to be accurately aligned along the optical axis with the small concave mirror 7, the LED 11, and the shade 4, hence contributing to the improvement in the optical characteristics of the vehicle light A or B.

One embodiments of the present invention has been explained above, but the present invention is not limited thereto, and various changes are possible within the scope of the present invention.

The present invention can be used in the automobile industry, and manufacturing field of vehicle electrical equipment and the like.

The entire contents of Japanese Patent Applications, No. P2003-431258 (filed Dec. 25, 2003), No. P2004-059680 (filed Mar. 3, 2004) and No. P2004-072993 (filed Mar. 15, 2004) are incorporated herein by reference.

What is claimed is:

1. A projector type vehicle light, comprising:
   a light source provided close to the primary focusing point of a concave mirror; and
   a convex lens for modulating the flux of light emitted from the light source and reflected by the concave mirror to a substantially parallel light which is then directed forward,
   wherein the light source comprises a group of LEDs;
   wherein each of the LEDs is located in each of a small concave mirror in a small reflector which has an ellipsoidal surface of rotation or a free surface as a part of the ellipsoidal surface of rotation provided on the inner surface thereof;
   wherein the convex lens comprises a group of small convex lenses provided to cover the front opening of the small reflectors respectively;
   wherein each of the LEDs is located close to the primary focusing point of the small concave mirror in the small reflector and faces an emitter side of the LED to the small concave mirror; and
   wherein a shade comes close to the secondary focusing point of the small concave mirror and assembled together with the small convex lens and the LEDs, whereby each of a plurality of small projector type lamps in an array is completed.

2. The projector type vehicle light, according to claim 1, wherein a light emitting potion of the LED is inclined so as to be lowered in the backward direction of the small concave mirror.

3. The projector type vehicle light, according to claim 1, wherein a light emitting potion of the LED is inclined in the wide direction of the small concave mirror.

4. The projector type vehicle light, according to claim 1, wherein the LED is horizontally offset from the primary focusing point to leftward or rightward in the wide direction of the small concave mirror.

5. A projector type vehicle light, comprising:
   a light source provided close to the primary focusing point of a concave mirror; and
   a convex lens for modulating the flux of light emitted from the light source and reflected by the concave mirror to a substantially parallel light which is then directed forward,
   wherein the light source comprises a group of LEDs;
   wherein each of the LEDs is located close to the primary focusing point of a small concave mirror in a small reflector and faces an emitter side of the LED to the small concave minor which has an ellipsoidal surface of rotation or a free surface as a part of the ellipsoidal surface of rotation provided on the inner surface thereof;
   wherein the convex lens comprises a group of small convex lenses provided to cover the front opening of the small reflectors respectively;

wherein the smaller reflectors and the small convex lenses are made of resin materials;

wherein the small reflector comprises an upper reflector formed integrally with the small concave mirror and a lower reflector formed integral with a shade which has a folded edge portion extending along the meridional plane and a reflective portion extending rearwardly from the top of the folded edge portion in substantially the horizontal wherein the lower reflector is joined from below to the upper reflector;

wherein the upper reflector and the lower reflector of the each small reflector are positioned so that the folded edge portion comes close to the secondary focusing point of the small concave mirror and assembled together with the small convex lens and the LED, whereby each of a plurality of small projector type lamps in an array is completed;

wherein in particular, at least one of the small projector type lamps in the array is arranged with the LED liftable about an orthogonal axis extending at a right angle to the optical axis of the small projective type lamp so that a pattern of lightness can be switched between the spot centered pattern of lighting and the spotless pattern of lighting; and wherein the array of the small projective type lamps are installed in a housing.

6. The projector type vehicle light, according to claim 5, wherein the projector type vehicle light is modified that the upper and lower reflectors are formed integral with holding portions for holding the small convex lens between the two reflectors.

7. A projector type vehicle light, comprising:

a light source provided close to the primary focusing point of a concave mirror; and a convex lens for modulating the flux of light emitted from the light source and reflected by the concave mirror to a substantially parallel light which is then directed forward, wherein the light source comprises a group of LEDs;

wherein each of the LEDs is located close to the primary focusing point of a small concave mirror in a small reflector and faces an emitter side of the LED to the small concave mirror which has an ellipsoidal surface of rotation or a free surface as a pan of the ellipsoidal surface of rotation provided on the inner surface thereof;

wherein the convex lens comprises a group of small convex lenses provided to cover the front opening of the small reflectors respectively;

wherein the smaller reflectors and the small convex lenses are made of resin materials;

wherein the small reflector comprises an upper reflector formed integrally with the small concave mirror and a lower reflector formed integral with a shade which has a folded edge portion extending along the meridional plane and a reflective portion extending rearwardly from the top of the folded edge portion in substantially the horizontal wherein the lower reflector is joined from below to the upper reflector, wherein the upper reflector and the lower reflector of the each small reflector are positioned so that the folded edge portion comes close to the secondary focusing point of the small concave mirror and assembled together with the small convex lens and the LED, whereby each of a plurality of small projector type lamps in an array is completed; and wherein in particular, at least one of the small projector type lamps in the array is arranged with the LED tiltable about the optical axis of the small projective type lamp so that a spot in the pattern of lighting can be moved to the left and the right within the pattern of lighting while the array of the small projective type lamps are installed in a housing.

8. The projector type vehicle light, according to claim 7, wherein the projector type vehicle light is modified that the upper and lower reflectors are formed integral with holding portions for holding the small convex lens between the two reflectors.

* * * * *